(12) United States Patent
Li et al.

(10) Patent No.: US 12,538,348 B2
(45) Date of Patent: Jan. 27, 2026

(54) METHOD AND APPARATUS FOR DETERMINING NUMBER OF CODED MODULATION SYMBOLS, AND COMMUNICATIONS DEVICE

(71) Applicant: VIVO MOBILE COMMUNICATION CO., LTD., Guangdong (CN)

(72) Inventors: Na Li, Guangdong (CN); Zhi Lu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 385 days.

(21) Appl. No.: 18/349,573

(22) Filed: Jul. 10, 2023

(65) Prior Publication Data

US 2023/0354404 A1 Nov. 2, 2023

Related U.S. Application Data

(63) Continuation of application No. PCT/CN2022/070450, filed on Jan. 6, 2022.

(30) Foreign Application Priority Data

Jan. 11, 2021 (CN) .......................... 202110033266.6

(51) Int. Cl.
  *H04W 72/21* (2023.01)
  *H04L 1/1829* (2023.01)
  *H04W 72/563* (2023.01)

(52) U.S. Cl.
  CPC ......... *H04W 72/563* (2023.01); *H04L 1/1854* (2013.01); *H04W 72/21* (2023.01)

(58) Field of Classification Search
  CPC ... H04L 1/0061; H04L 1/0072; H04L 1/1671; H04L 1/1854; H04L 5/0055; H04W 72/21; H04W 72/563

(Continued)

(56) References Cited

U.S. PATENT DOCUMENTS

2019/0254022 A1   8/2019  Yeo et al.
2020/0313732 A1  10/2020  Yang et al.
(Continued)

FOREIGN PATENT DOCUMENTS

CN    110166207 A    8/2019
CN    110768773 A    2/2020
(Continued)

OTHER PUBLICATIONS

Huawei, Hisilicon, "Intra-UE multiplexing enhancements", 3GPP TSG RAN WG1 Meeting #103-e, R1-2007567, E-meeting, Oct. 26-Nov. 13, 2020.

(Continued)

*Primary Examiner* — Robert J Lopata
(74) *Attorney, Agent, or Firm* — Price Heneveld LLP

(57) ABSTRACT

A method and an apparatus for determining the number of coded modulation symbols, and a communications device are provided. The method includes: obtaining, by a communications device, at least one control factor, where the control factor is used to limit a resource occupied when UCI is multiplexed on a PUSCH; determining first target UCI and second target UCI multiplexed on a target PUSCH for transmission, where a priority of the first target UCI is a first priority, a priority of the second target UCI is a second priority, and the first priority is lower than the second priority; and separately determining, according to a target control factor, the number of coded modulation symbols per layer in a case that the first target UCI and the second target UCI are multiplexed on the target PUSCH.

20 Claims, 4 Drawing Sheets

(58) Field of Classification Search
USPC .......................................................... 370/329
See application file for complete search history.

(56) References Cited

U.S. PATENT DOCUMENTS

| | | |
|---|---|---|
| 2020/0314762 A1 | 10/2020 | Hosseini et al. |
| 2020/0374869 A1 | 11/2020 | Li et al. |
| 2021/0168794 A1 | 6/2021 | Zhang et al. |
| 2021/0321394 A1 | 10/2021 | Li et al. |
| 2022/0078768 A1* | 3/2022 | El Hamss ............. H04L 1/1812 |
| 2022/0132496 A1 | 4/2022 | Lu et al. |
| 2022/0132537 A1* | 4/2022 | Wang .................... H04L 1/0061 |
| 2022/0183025 A1* | 6/2022 | Fröberg Olsson .... H04L 5/0044 |
| 2022/0191882 A1 | 6/2022 | Lee et al. |
| 2022/0240281 A1* | 7/2022 | Wang .................... H04L 5/0053 |
| 2022/0279538 A1* | 9/2022 | Jung ................. H04W 72/1268 |
| 2022/0386362 A1* | 12/2022 | Sun ........................ H04W 72/23 |
| 2023/0054490 A1* | 2/2023 | Wong ................... H04L 1/1664 |
| 2023/0189273 A1* | 6/2023 | Fu ........................ H04L 5/0044 370/329 |
| 2024/0284494 A1* | 8/2024 | Kim .......................... H04L 1/08 |

FOREIGN PATENT DOCUMENTS

| | | |
|---|---|---|
| CN | 110809320 A | 2/2020 |
| CN | 111263448 A | 6/2020 |
| CN | 111314033 A | 6/2020 |
| CN | 111835480 A | 10/2020 |
| WO | 2019069296 A1 | 4/2019 |
| WO | 2020197338 A1 | 10/2020 |
| WO | 2020202068 A1 | 10/2020 |

OTHER PUBLICATIONS

OPPO, "Summary#1 on Intra-UE Multiplexing/Prioritization for R17", GPP TSG RAN WG1 #103-e, R1-2009045 e-Meeting, Oct. 26-Nov. 13, 2020.

Qualcomm Incorporated, Summary of UCI multiplexing on Pusch, 3GPP TSG RAN WG1 Meeting #94bis, R1- 1811917, Oct. 8-12, 2018, Chengdu, China.

* cited by examiner

METHOD AND APPARATUS FOR DETERMINING NUMBER OF CODED MODULATION SYMBOLS, AND COMMUNICATIONS DEVICE

CROSS-REFERENCE TO RELATED APPLICATIONS

The present invention is a continuation application of PCT International Application No. PCT/CN2022/070450 filed on Jan. 6, 2022, which claims priority to Chinese Patent Application No. 202110033266.6, filed with the China National Intellectual Property Administration on Jan. 11, 2021, and entitled "METHOD AND APPARATUS FOR DETERMINING NUMBER OF CODED MODULATION SYMBOLS, AND COMMUNICATIONS DEVICE", the disclosures of which are incorporated herein by reference in its entireties.

TECHNICAL FIELD

This application pertains to the field of wireless communications technologies, and specifically relates to a method and an apparatus for determining the number of coded modulation symbols, and a communications device.

BACKGROUND

In a new radio (NR) system, considering that user equipment (UE) may support different services simultaneously, but different services correspond to different service requirements in terms of latency, reliability, and the like, a mechanism for marking a priority of a physical uplink control channel (PUCCH) and/or a physical uplink shared channel (PUSCH) is introduced. Specifically, two physical layer priorities are introduced, that is, a high priority and a low priority.

To reduce impact on low-priority transmission, a current communications system supports multiplexing between a PUCCH and a PUSCH with different priorities. For example, a high-priority (HP) hybrid automatic repeat request acknowledgment (HARQ-ACK) is multiplexed on a low-priority (LP) PUSCH, or an LP HARQ-ACK is multiplexed on an HP PUSCH.

Therefore, when UE supports multiplexing between a PUCCH and a PUSCH with different priorities, uplink control information (UCI) with different priorities may be multiplexed on an HP PUSCH or an LP PUSCH simultaneously. However, according to the technical solution provided in the related art, only the number of coded modulation symbols per layer can be determined when UCI with a same priority is multiplexed on one PUSCH. Therefore, how to determine the number of coded modulation symbols per layer when UCI with different priorities is multiplexed on a PUSCH is a technical problem that needs to be resolved currently.

SUMMARY

Embodiments of this application provide a method and an apparatus for determining the number of coded modulation symbols, and a communications device.

According to a first aspect, a method for determining the number of coded modulation symbols is provided. The method includes: obtaining, by a communications device, at least one control factor, where the control factor is used to limit a resource occupied when uplink control information UCI is multiplexed on a physical uplink shared channel PUSCH; determining first target UCI and second target UCI multiplexed on a target PUSCH for transmission, where a priority of the first target UCI is a first priority, a priority of the second target UCI is a second priority, and the first priority is lower than the second priority; and separately determining, according to a target control factor, the number of coded modulation symbols per layer in a case that the first target UCI and the second target UCI are multiplexed on the target PUSCH, where the target control factor is one or more of the at least one control factor.

According to a second aspect, an apparatus for determining the number of coded modulation symbols is provided. The apparatus includes: an obtaining module, configured to obtain at least one control factor, where the control factor is used to limit a resource occupied when uplink control information UCI is multiplexed on a physical uplink shared channel PUSCH; a first determining module, configured to determine first target UCI and second target UCI multiplexed on a target PUSCH for transmission, where a priority of the first target UCI is a first priority, a priority of the second target UCI is a second priority, and the first priority is lower than the second priority; and a second determining module, configured to separately determine, according to a target control factor, the number of coded modulation symbols per layer in a case that the first target UCI and the second target UCI are multiplexed on the target PUSCH, where the target control factor is one or more of the at least one control factor.

According to a third aspect, a communications device is provided. The communications device includes a processor, a memory, and a program or instructions stored in the memory and capable of running on the processor. When the program or instructions are executed by the processor, the steps of the method according to the first aspect are implemented.

According to a fourth aspect, a readable storage medium is provided. The readable storage medium stores a program or instructions. When the program or instructions are executed by a processor, the steps of the method according to the first aspect are implemented.

According to a fifth aspect, a chip is provided. The chip includes a processor and a communications interface. The communications interface is coupled to the processor. The processor is configured to run a program or instructions to implement the steps of the method according to the first aspect.

According to a sixth aspect, a computer program product is provided. The computer program product includes a processor, a memory, and a program or instructions stored in the memory and capable of running on the processor. When the program or instructions are executed by the processor, the steps of the method according to the first aspect are implemented.

In the embodiments of this application, the communications device obtains at least one control factor; the communications device determines first target UCI and second target UCI multiplexed on a target PUSCH for transmission, where a priority of the first target UCI is a first priority, a priority of the second target UCI is a second priority, and the first priority is lower than the second priority; and then the communications device separately determines, according to a target control factor, the number of coded modulation symbols per layer in a case that the first target UCI and the second target UCI are multiplexed on the target PUSCH, where the target control factor is one or more of the at least one control factor. Therefore, the communications device can separately determine the number of coded modulation symbols per layer when UCI with different priorities is multiplexed on a PUSCH.

DETAILED DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

The terms "first", "second", and the like in this specification and claims of this application are used to distinguish between similar objects instead of describing a specific order or sequence. It should be understood that the terms used in this way are interchangeable in appropriate circumstances, so that the embodiments of this application can be implemented in other orders than the order illustrated or described herein. In addition, objects distinguished by "first" and "second" usually fall within one class, and a quantity of objects is not limited. For example, there may be one or more first objects. In addition, the term "and/or" in the specification and claims indicates at least one of connected objects, and the character "/" generally represents an "or" relationship between associated objects.

It should be noted that technologies described in the embodiments of this application are not limited to a long term evolution (LTE)/LTE-Advanced (LTE-A) system, and can also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. The described technologies may be used for the foregoing systems and radio technologies, and may also be used for other systems and radio technologies. In the following descriptions, a new radio (NR) system is described for an illustrative purpose, and NR terms are used in most of the following descriptions. However, these technologies may also be applied to other applications than an NR system application, for example, a 6th Generation (6G) communications system.

Figure 1:
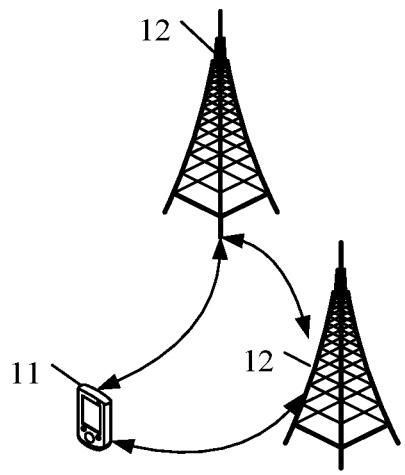
FIG. 1 is a schematic diagram of a wireless communications system to which an embodiment of this application may be applied.

FIG. 1 is a schematic diagram of a wireless communications system to which an embodiment of this application may be applied. The wireless communications system includes a terminal 11 and a network-side device 12. The terminal 11 may also be referred to as a terminal device or a user terminal (UE). The terminal 11 may be a terminal-side device such as a mobile phone, a tablet personal computer, a laptop computer or a notebook computer, a personal digital assistant (PDA), a palmtop computer, a netbook, an ultra-mobile personal computer (UMPC), a mobile Internet device (MID), a wearable device, vehicle user equipment (VUE), or pedestrian user equipment (PUE). The wearable device includes a band, earphones, glasses, or the like. It should be noted that a specific type of the terminal 11 is not limited in the embodiments of this application. The network-side device 12 may be a base station or a core network. The base station may be referred to as an access point, a base transceiver station (BTS), a radio base station, a radio transceiver, a basic service set (BSS), an extended service set (ESS), a NodeB, an evolved NodeB (eNB), a home NodeB, a home evolved NodeB, a wireless local area network (WLAN) access point, a Wireless Fidelity (Wi-Fi) node, a transmission and reception point (TRP), or another appropriate term in the art, as long as the same technical effect is achieved. The base station is not limited to specific technical terms. It should be noted that in the embodiments of this application, only a base station in an NR system is used as an example, but a specific type of the base station is not limited.

A method for determining the number of coded modulation symbols according to the embodiments of this application is hereinafter described in detail by using specific embodiments and application scenarios thereof with reference to the accompanying drawings.

Figure 2:
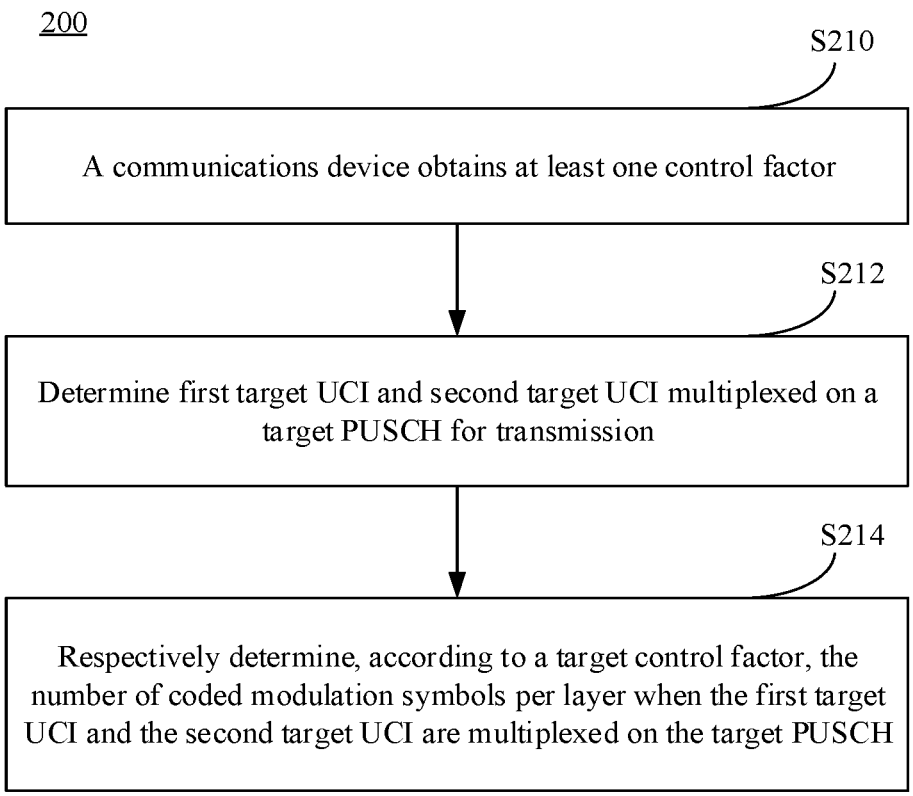
FIG. 2 is a flowchart of a method for determining the number of coded modulation symbols according to an embodiment of this application.

FIG. 2 is a schematic flowchart of a method for reporting channel state information according to an embodiment of this application. The method 200 may be performed by a terminal. In other words, the method may be performed by software or hardware installed on the terminal. As shown in FIG. 2, the method may include the following steps.

S210. A communications device obtains at least one control factor, where the control factor is used to limit a resource occupied when uplink control information UCI is multiplexed on a PUSCH.

In this embodiment of this application, the communications device may be a network-side device, for example, a base station, or may be a terminal. Therefore, in a possible implementation, that a communications device obtains at least one control factor may include: a network-side device configures the at least one control factor for a terminal; or a terminal obtains the at least one control factor configured by a network-side device.

In this embodiment of this application, the control factor may be a parameter a used to control the number of coded modulation symbols per layer when the UCI is multiplexed on the PUSCH, or the control factor may be a parameter a used to control the number of occupied resource elements when the UCI is multiplexed on the PUSCH.

The network-side device may configure multiple control factors for the terminal. For example, PUSCHs with different priorities may be configured separately, and parameters for multiplexing UCI with different priorities may also be configured for a PUSCH with a certain priority. Therefore, in a possible implementation, in a case that UCI with different priorities is multiplexed on PUSCHs with different priorities, corresponding control factors may be different. For example, the network-side device may configure at least one of the following control factors α for the terminal:

$\alpha_1$: used to multiplex LP UCI on an LP (that is, a first priority in this embodiment of this application) PUSCH;

$\alpha_1$: used to multiplex HP (that is, a second priority in this embodiment of this application) UCI on an LP PUSCH;

$\alpha_3$: used to multiplex HP UCI on an HP PUSCH; and $\alpha_4$: used to multiplex LP UCI on an HP PUSCH.

Optionally, a value of a may be a value within a range of [0, 1].

In addition, in the foregoing possible implementations, values of $\alpha_1$ to $\alpha_4$ may be the same or different, or part thereof may be different, or all thereof may be different. This is not specifically limited in this embodiment.

In this embodiment of this application, when the network-side device configures multiple control factors for the terminal, optionally, different control factors may be configured separately, or configured together, or partially configured together. When different control factors are configured together, the control factors configured together may be combined into one control factor. For example, $\alpha_1$ and $\alpha_2$ are configured by using one parameter, and $\alpha_3$ and $\alpha_4$ are configured by using one parameter. In this case, $\alpha_3$ and $\alpha_4$ may be expressed as one control factor, for example, ax, and there is no need to distinguish between $\alpha_3$ and $\alpha_4$.

In a specific application, the network-side device may configure the control factor by using a radio resource control (RRC) scaling parameter. Therefore, the control factor may also be referred to as a scaling factor. This is not specifically limited in this embodiment of this application.

S212. Determine first target UCI and second target UCI multiplexed on a target PUSCH for transmission, where a priority of the first target UCI is a first priority, a priority of the second target UCI is a second priority, and the first priority is lower than the second priority.

For example, a PUCCH transmitting the first target UCI and the second target UCI collides with a time domain transmission resource of the target PUSCH, or a PUCCH transmitting the first target UCI and a PUCCH transmitting the second target UCI both collide with a transmission resource of the target PUSCH, or a PUCCH time domain resource transmitting the first target UCI collides with a target PUSCH time domain resource transmitting the second target UCI, or a PUCCH time domain resource transmitting the second target UCI collides with a PUSCH time domain resource transmitting the first target UCI. In the foregoing cases, the first target UCI and the second target UCI need to be multiplexed on the target PUSCH for transmission.

S214. Respectively determine, according to a target control factor, the number of coded modulation symbols per layer in a case that the first target UCI and the second target UCI are multiplexed on the target PUSCH, where the target control factor is one or more of the at least one control factor.

In this embodiment of this application, for the first target UCI and the second target UCI with different priorities that are multiplexed on the target PUSCH, the communications device may separately determine, according to the target control factor, the number of coded modulation symbols per layer when the first target UCI is multiplexed on the target PUSCH, and the number of coded modulation symbols per layer when the second target UCI is multiplexed on the target PUSCH.

For example, if corresponding control factors are different in a case that UCI with different priorities is multiplexed on PUSCHs with different priorities, a control factor corresponding to the first target UCI and the target PUSCH may be used to determine the number of coded modulation symbols per layer for the first target UCI, and a control factor corresponding to the second target UCI and the target PUSCH is used to determine the number of coded modulation symbols per layer for the second target UCI.

In a possible implementation, because UCI with multiple priorities is multiplexed on the target PUSCH, but UCI with a same priority may include different types of UCI, in a possible implementation, it is possible to determine, in one of the following orders, the number of coded modulation symbols per layer for the first target UCI and the second target UCI.

(1) The number of coded modulation symbols per layer in a case that high-priority UCI is multiplexed on the target PUSCH is first determined, and then the number of coded modulation symbols per layer in a case that low-priority UCI is multiplexed on the target PUSCH is determined, where in a case that UCI with a same priority includes different types of UCI, the number of coded modulation symbols per layer when hybrid automatic repeat request acknowledgement (HARQ-ACK) information is multiplexed on the target PUSCH is first determined, and then the number of coded modulation symbols per layer when channel state information (CSI) is multiplexed on the target PUSCH is determined.

In other words, the number of coded modulation symbols per layer for the high-priority UCI is first determined, and then the number of coded modulation symbols per layer for the low-priority UCI is determined. To be specific, the number of coded modulation symbols per layer when the low-priority UCI is multiplexed on the target PUSCH needs to be determined according to the number of coded modulation symbols per layer when the high-priority UCI is multiplexed on the target PUSCH. However, if the UCI with the same priority includes different types of UCI, the number of coded modulation symbols per layer for the HARQ-ACK is first determined, and then the number of coded modulation symbols per layer for the CSI is determined. To be specific, the number of coded modulation symbols per layer when the CSI with the same priority is multiplexed on the target PUSCH needs to be determined according to the number of coded modulation symbols per layer when the HARQ-ACK with the same priority is multiplexed on the target PUSCH (if the HARQ-ACK with the same priority is multiplexed on target PUSCH).

For example, if the UCI multiplexed on the target PUSCH includes an HP HARQ-ACK, an LP HARQ-ACK, HP-CSI, and LP CSI, the number of coded modulation symbols per layer for the UCI may be determined in the following order: HP HARQ-ACK, HP CSI, LP HARQ-ACK, and LP CSI.

For another example, if the UCI multiplexed on the target PUCSH includes HP CSI and an LP HARQ-ACK, the number of coded modulation symbols per layer for the UCI when the HP CSI is multiplexed on the target PUSCH may be first determined, and then the number of coded modulation symbols per layer for the UCI when the LP HARQ-ACK is multiplexed on the target PUSCH is determined according to the number of coded modulation symbols per layer for the UCI when the HP CSI is multiplexed on the target PUSCH.

(2) The number of coded modulation symbols per layer in a case that a HARQ-ACK is multiplexed on the target PUSCH is first determined, and then the number of coded modulation symbols per layer in a case that CSI is multiplexed on the target PUSCH is determined. To be specific, the number of coded modulation symbols per layer when the CSI is multiplexed on the target PUSCH needs to be determined according to the number of coded modulation symbols per layer when the HARQ-ACK is multiplexed with the target PUSCH. If a same type of UCI includes UCI with different priorities, the number of coded modulation symbols per layer in a case that high-priority UCI is multiplexed on the target PUSCH is first determined, and then the number of coded modulation symbols per layer in a case that low-priority UCI is multiplexed on the target PUSCH is determined. To be specific, for the same type of UCI, the number of coded modulation symbols per layer when the low-priority UCI is multiplexed on the target PUSCH needs to be determined according to the number of coded modulation symbols per layer when the high-priority UCI is multiplexed on the target PUSCH (if the high-priority UCI is multiplexed on the target PUSCH).

In other words, the order is first determined according to the UCI type, that is, the order is first the HARQ-ACK, and then the CSI, but for the same type of UCI, the order is first the high-priority UCI, and then the low-priority UCI. For example, if the UCI multiplexed on the target PUSCH includes an HP HARQ-ACK, an LP HARQ-ACK, HP-CSI, and LP CSI, the number of coded modulation symbols per layer for the UCI may be determined in the following order: HP HARQ-ACK, LP HARQ-ACK, HP CSI, and LP CSI.

For another example, if the UCI multiplexed on the target PUCSH includes HP CSI and an LP HARQ-ACK, the number of coded modulation symbols per layer for the UCI when the LP HARQ-ACK is multiplexed on the target PUSCH may be first determined, and then the number of coded modulation symbols per layer for the UCI when the HP CSI is multiplexed on the target PUSCH is determined according to the number of coded modulation symbols per layer for the UCI when the LP HARQ-ACK is multiplexed on the target PUSCH.

It should be noted that, in this embodiment of this application, it is not required that all UCI (such as a first-priority HARQ-ACK, first-priority CSI, a second-priority HARQ-ACK, and second-priority CSI) should be multiplexed on the target PUSCH. When UCI is not multiplexed on the target PUSCH, there is no need to determine the number of coded modulation symbols per layer for multiplexing the UCI on the target PUSCH, and a corresponding value thereof (such as the following $Q'_{ACK,HP}$ and $Q'_{ACK,LP}$) is 0.

In a specific application, because there may be uplink service information on the target PUSCH, that is, the PUSCH with UL-SCH, or there may be no uplink service information on the target PUSCH, that is, the PUSCH without UL-SCH, in different cases, different manners may be used to determine the number of coded modulation symbols per layer in a case that the first target UCI and the second target UCI are multiplexed on the target PUSCH. The following describes the two cases separately.

(I) There is uplink service information, that is, an uplink shared channel (UL-SCH), on the target PUSCH.

In this possible implementation, there is uplink service information on the target PUSCH, and the target PUSCH does not use type B repetition, that is, the target PUSCH does not use repetition type B.

In a specific application, because a priority of the target PUSCH may be the first priority or the second priority, to improve efficiency of a communications system, for target PUSCHs with different priorities, different manners may be used to determine the number of coded modulation symbols per layer when target UCI is multiplexed on the target PUSCH. The following describes the manners separately.

1. The priority of the target PUSCH is the first priority.

In a possible implementation, in a case that there is uplink service information on the target PUSCH and that the priority of the target PUSCH is the first priority, for a second-priority target HARQ-ACK included in the second target UCI, the number $Q'_{ACK,HP}$ of coded modulation symbols per layer when the target HARQ-ACK is multiplexed on the target PUSCH may be determined according to the following formula:

$$Q'_{ACK,HP} = \min\left\{ \left\lceil \frac{(O_{ACK,HP} + L_{ACK,HP}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha_2 \cdot \sum_{l=l_0}^{N_{symb,all}^{PUSCH}-1} M_{sc}^{UCI}(l) \right\rceil \right\} \quad (1)$$

where $\alpha_2$ is the second control factor, $O_{ACK,HP}$ is the number of bits of the second-priority target HARQ-ACK, $L_{ACK,HP}$ is the number of cyclic redundancy check (CRC) bits corresponding to the target HARQ-ACK, $\beta_{offset}^{PUSCH}$ is a parameter for calculating the number of coded modulation symbols used when the second-priority HARQ-ACK is transmitted on the first-priority PUSCH, for example, $\beta_{offset}^{PUSCH} = \beta_{offset}^{PUSCH,ACK,HP}$, $M_{sc}^{UCI}(l)$ is the number of resource elements (RE) available for transmitting UCI in an orthogonal frequency division multiplexing (OFDM) symbol l transmitted on the target PUSCH, $l=0, 1, 2, \ldots, N_{symb,all}^{PUSCH}-1$, $N_{symb,all}^{PUSCH}$ is the total number of OFDM symbols of the target PUSCH inclusive of an OFDM symbol used for transmitting a demodulation reference signal (DMRS), if downlink control information (DCI) scheduling the target PUSCH instructs the terminal not to transmit an r-th transport block, $K_r=0$, or else, $K_r$ is a size of an r-th transport block of the uplink service information on the target PUSCH, and $C_{UL-SCH}$ is the number of transport blocks of the uplink service information on the target PUSCH.

For an OFDM symbol carrying a DMRS on the PUSCH, its corresponding $M_{sc}^{UCI}(l)$ is 0. For an OFDM symbol not carrying a DMRS on the PUSCH, its corresponding $M_{sc}^{UCI}(l)$ is $M_{sc}^{UCI}(l) = M_{sc}^{PUSCH} - M_{sc}^{PT-RS}(l)$.

In another possible implementation, in a case that there is uplink service information on the target PUSCH and that the priority of the target PUSCH is the first priority, for second-priority target CSI included in the second target UCI, the number $Q'_{CSI-1,HP}$ of coded modulation symbols per layer when a channel state information part 1 CSI-part1 in the target CSI is multiplexed on the target PUSCH, and the number $Q'_{CSI-2,HP}$ of coded modulation symbols per layer when a channel state information part 2 CSI-part2 in the target CSI is multiplexed on the target PUSCH are determined according to the following formulas:

$$Q'_{CSI-1,HP} = \min\left\{ \left\lceil \frac{(O_{CSI-1,HP} + L_{CSI-1,HP}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \right. \quad (2)$$

-continued $$\left[\alpha_2 \cdot \sum_{l=0}^{N_{symb,all}^{PUSCH}-1} M_{sc}^{UCI}(l)\right] - Q'_{ACK,HP}\right\} \text{ and} \quad (2')$$

$$Q_{CSI-2,HP} = \min\left\{\left[\frac{(O_{CSI-2,HP} + L_{CSI-2,HP}) \cdot \beta_{offset}^{PUSCH} \cdot}{\sum_{l=0}^{N_{symb,all}^{PUSCH}-1} M_{sc}^{UCI}(l)}\right]\right., \quad (3)$$

$$\left[\alpha_2 \cdot \sum_{l=0}^{N_{symb,all}^{PUSCH}-1} M_{sc}^{UCI}(l)\right] - Q'_{ACK,HP} - Q'_{CSI-1,HP}\right\}$$

where $Q'_{ACK,HP}$ is the number of coded modulation symbols per layer when a second-priority HARQ-ACK is multiplexed on the target PUSCH, optionally, $Q'_{ACK,HP}$ may be determined according to the foregoing formula (1), $\alpha_2$ is the second control factor, $O_{CSI-1,HP}$ is the number of bits of the CSI-part1, $L_{CSI-1,HP}$ is the number of CRC bits corresponding to the CSI-part1, $\beta_{offset}^{PUSCH}$ is a parameter for respectively calculating the number of coded modulation symbols used when the second-priority CSI part 1 and CSI part 2 are transmitted on the first-priority PUSCH, for example, $\beta_{offset}^{PUSCH} = \beta_{offset}^{CSI-part1,HP}$ and $\beta_{offset}^{PUSCH} = \beta_{offset}^{CSI-part1,HP}$ in the foregoing formula (2) and formula (3), $O_{CSI-2,HP}$ is the number of bits of the CSI-part2, and $L_{CSI-2,HP}$ is the number of CRC bits corresponding to the CSI-part2. Meanings of other parameters are the same as those in the formula 1 and are not described herein again.

It should be noted that, if no HP HARQ-ACK is multiplexed on the target PUSCH, a value of $Q'_{ACK,HP}$ is 0.

In this embodiment of this application, for PUSCHs with different priorities and UCI with different priorities and/or of different types, $\beta_{offset}^{PUSCH}$ may be the same or different, and may be specifically determined based on an actual application. This is not specifically limited in this embodiment of this application.

In another implementation, in a case that there is uplink service information on the target PUSCH and that the priority of the target PUSCH is the first priority, for a first-priority target HARQ-ACK included in the first target UCI, the number $Q'_{ACK,LP}$ of coded modulation symbols per layer when the target HARQ-ACK is multiplexed on the target PUSCH is determined according to the following formula:

$$Q'_{ACK,LP} = \min\left\{\left[\frac{(O_{ACK,LP} + L_{ACK,LP}) \cdot \beta_{offset}^{PUSCH} \cdot}{\sum_{l=0}^{N_{symb,all}^{PUSCH}-1} M_{sc}^{UCI}(l)}\right], \max \right. \quad (4)$$

$$\left\{\left[\alpha_1 \cdot \sum_{l=l_0}^{N_{symb,all}^{PUSCH}-1} M_{sc}^{UCI}(l)\right] - Q'_{ACK,HP} - Q'_{CSI-1,HP} - Q'_{CSI-2,HP}, 0\right\}\right\} \text{ or}$$

$$Q'_{ACK,LP} = \min\left\{\left[\frac{(O_{ACK,LP} + L_{ACK,LP}) \cdot \beta_{offset}^{PUSCH} \cdot}{\sum_{l=0}^{N_{symb,all}^{PUSCH}-1} M_{sc}^{UCI}(l)}\right], \right. \quad (5)$$

$$\left[\alpha_1 \cdot \left(\sum_{l=l_0}^{N_{symb,all}^{PUSCH}-1} M_{sc}^{UCI}(l) - Q'_{ACK,HP} - Q'_{CSI-1,HP} - Q'_{CSI-2,HP}\right)\right]\right\}$$

where $\alpha_1$ is the first control factor, $O_{ACK,LP}$ is the number of bits of the first-priority target HARQ-ACK, $L_{ACK,LP}$ is the number of CRC bits corresponding to the target HARQ-ACK, and $\beta_{offset}^{PUSCH}$ is a parameter for calculating the number of coded modulation symbols used when the first-priority HARQ-ACK is transmitted on the first-priority PUSCH. $Q'_{ACK,HP}$ is the number of coded modulation symbols per layer when a second-priority HARQ-ACK is multiplexed on the target PUSCH, and optionally, may be determined according to the foregoing formula (1). $Q'_{CSI-1,HP}$ number of coded modulation symbols per layer when a second-priority CSI-part1 is multiplexed on the target PUSCH, and optionally, may be determined according to the foregoing formula (2). $Q'_{CSI-2,HP}$ is the number of coded modulation symbols per layer when a second-priority CSI-part2 is multiplexed on the target PUSCH, and optionally, may be determined according to the foregoing formula (3).

It should be noted that, if no HP CSI is multiplexed on the target PUSCH, values of $Q'_{CSI-1,HP}$ and $Q'_{CSI-2,HP}$ are 0. Other cases described later are similar to this.

In still another possible implementation, in a case that there is uplink service information on the target PUSCH and that the priority of the target PUSCH is the first priority, for first-priority target CSI included in the first target UCI, the number $Q'_{CSI-1,LP}$ of coded modulation symbols per layer when a CSI-part1 in the target CSI is multiplexed on the target PUSCH, and the number $Q'_{CSI-2,HP}$ of coded modulation symbols per layer when a CSI-part2 in the target CSI is multiplexed on the target PUSCH are determined according to the following formulas:

$Q'_{CSI-1,LP}$ is:

$$Q'_{CSI-1,LP} = \min \quad (6)$$

$$\left\{\left[\frac{(O_{CSI-1,LP} + L_{CSI-1,LP}) \cdot \beta_{offset}^{PUSCH} \cdot}{\sum_{l=0}^{N_{symb,all}^{PUSCH}-1} M_{sc}^{UCI}(l)}\right], \max\left\{\left[\alpha_1 \cdot \sum_{l=0}^{N_{symb,all}^{PUSCH}-1} M_{sc}^{UCI}(l)\right] - \right.\right.$$

$$\left.\left. Q'_{ACK,HP} - Q'_{CSI-1,HP} - Q'_{CSI-2,HP} - Q'_{ACK/CG-UCI,LP}, 0\right\}\right\} \text{ or}$$

$$Q'_{CSI-1,LP} = \quad (7)$$

-continued $$\min\left\{\left[\frac{(O_{CSI-1,LP}+L_{CSI-1,LP})\cdot\beta_{offset}^{PUSCH}\cdot}{\sum_{l=0}^{N_{symb,all}^{PUSCH}-1}M_{sc}^{UCI}(l)}\right], \left[\alpha_1\cdot\left(\sum_{l=0}^{N_{symb,all}^{PUSCH}-1}M_{sc}^{UCI}(l)--\right.\right.\right.$$

$$\left.\left.\left.Q'_{ACK,HP}-Q'_{CSI-1,HP}-Q'_{CSI-2,HP}-Q'_{ACK/CG-UCI,LP}\right)\right]\right\}$$

and $Q'_{CSI-2,LP}$ is:

(8)

$Q'_{CSI-2,LP} = \min$ $$\left\{\left[\frac{(O_{CSI-2,LP}+L_{CSI-2,LP})\cdot\beta_{offset}^{PUSCH}\cdot}{\sum_{l=0}^{N_{symb,all}^{PUSCH}-1}M_{sc}^{UCI}(l)}\right], \max\left\{\left[\alpha_1\cdot\sum_{l=0}^{N_{symb,all}^{PUSCH}-1}M_{sc}^{UCI}(l)\right]-\right.\right.$$

$$\left.\left.Q'_{ACK,HP}-Q'_{CSI-1,HP}-Q'_{CSI-2,HP}-Q'_{ACK/CG-UCI,LP}, 0\right\}\right\}$$ or (9)

$Q'_{CSI-2,LP} =$ $$\min\left\{\left[\frac{(O_{CSI-2,LP}+L_{CSI-2,LP})\cdot\beta_{offset}^{PUSCH}\cdot}{\sum_{l=0}^{N_{symb,all}^{PUSCH}-1}M_{sc}^{UCI}(l)}\right], \left[\alpha_1\cdot\left(\sum_{l=0}^{N_{symb,all}^{PUSCH}-1}M_{sc}^{UCI}(l)-\right.\right.\right.$$

$$\left.\left.\left.Q'_{ACK,HP}-Q'_{CSI-1,HP}-Q'_{CSI-2,HP}-Q'_{ACK/CG-UCI,LP}-Q'_{CSI-1,LP}\right)\right]\right\}$$

where if there is no configured grant uplink control information (CG-UCI) on the target PUSCH, $Q'_{ACK/CG-UCI,LP}=Q'_{ACK+CG-UCI,LP}$; or in a case that CG-UCI is transmitted on the target PUSCH, $Q'_{ACK/CG-UCI,LP}=Q'_{ACK+CG-UCI,LP}$; or in a case that CG-UCI is transmitted on the target PUSCH, but no first-priority HARQ-ACK is transmitted on the target PUSCH, $Q'_{ACK/CG-UCI,LP}=Q'_{CG-UCI}$;

where $Q'_{ACK,LP}$ is the number of coded modulation symbols per layer when the first-priority HARQ-ACK is multiplexed on the target PUSCH, and optionally, may be determined according to the foregoing formula (4) or (5); $Q'_{ACK+CG-UCI,LP}$ is the number of coded modulation symbols per layer when the first-priority HARQ-ACK and the CG-UCI are multiplexed on the target PUSCH, and optionally, may be determined by using a formula similar to the foregoing formula (4) or (5), where, for example, $O_{ACK,LP}$ in the formula (4) or (5) is replaced with a sum of the number of bits of the first-priority target HARQ-ACK and the number of bits of the CG-UCI, $L_{ACK,LP}$ is replaced with a sum of the number of CRC bits corresponding to the target HARQ-ACK and the number of CRC bits corresponding to the CG-UCI, and $\beta_{offset}^{PUSCH}$ in the formula (4) or (5) is replaced with a parameter for calculating the number of coded modulation symbols used when the first-priority HARQ-ACK and the CG-UCI are transmitted on the first-priority PUSCH; $Q'_{CG-UCI}$ the number of coded modulation symbols per layer when the CG-UCI is transmitted on the target PUSCH, and optionally, may be determined by using a formula similar to the foregoing formula (4) or (5), where, for example, $O_{ACK,LP}$ in the formula (4) or (5) is replaced with the number of bits of the CG-UCI, $L_{ACK,LP}$ is replaced with a sum of the number of bits and the number of CRC bits corresponding to the CG-UCI, and $\beta_{offset}^{PUSCH}$ in the formula (4) or (5) is replaced with a parameter for calculating the number of coded modulation symbols used when the CG-UCI is transmitted on the first-priority PUSCH.

In the foregoing formulas (6) to (9), $\alpha_1$ is the first control factor, $M_{sc}^{UCI}(l)$ is the number of resource elements REs available for transmitting UCI in an OFDM symbol l transmitted on the target PUSCH, l=0, 1, 2, . . . , $N_{symb,all}^{PUSCH}$−1, $N_{symb,all}^{PUSCH}$ is the total number of OFDM symbols of the target PUSCH inclusive of an OFDM symbol used for transmitting a DMRS, in a case that DCI scheduling the target PUSCH instructs the terminal not to transmit an r-th transport block, $K_r$=0, or else, $K_r$ is a size of an r-th transport block of the uplink service information on the target PUSCH, $C_{UL-SCH}$ is the number of transport blocks of the uplink service information on the target PUSCH, $O_{CSI-1,LP}$ is the number of bits of the CSI-part1, $L_{CSI-1,LP}$ is the number of CRC bits corresponding to the CSI-part1, $\beta_{offset}^{PUSCH}$ is a parameter for calculating the number of coded modulation symbols used when the first-priority CSI is transmitted on the first-priority PUSCH, $O_{CSI-2,LP}$ is the number of bits of the CSI-part2, and $L_{CSI-2,LP}$ is the number of CRC bits corresponding to the CSI-part2: $Q'_{ACK,HP}$ is the number of coded modulation symbols per layer when a second-priority HARQ-ACK is multiplexed on the target PUSCH, and may be determined according to the foregoing formula (1); $Q'_{CSI-1,HP}$ is the number of coded modulation symbols per layer when a second-priority CSI-part1 is multiplexed on the target PUSCH, and may be determined according to the foregoing formula (2); and $Q'_{CSI-2,HP}$ is the number of coded modulation symbols per layer when a second-priority CSI-part2 is multiplexed on the target PUSCH, and may be determined according to the foregoing formula (3).

In the foregoing possible implementation, optionally, in a case that only one of the first-priority CSI and second-priority CSI is capable of being multiplexed on the target PUSCH, values of $Q'_{CSI-1,HP}$ and $Q'_{CSI-2,HP}$ are 0.

2. The priority of the target PUSCH is the second priority.

In a possible implementation, in a case that there is uplink service information on the target PUSCH and that the priority of the target PUSCH is the second priority, for a second-priority target HARQ-ACK included in the second target UCI, the number $Q'_{ACK,HP}$ of coded modulation symbols per layer when the target HARQ-ACK is multiplexed on the target PUSCH is determined according to the following formula:

$$Q'_{ACK,HP} = \min\left\{\left\lceil\frac{(O_{ACK,HP} + L_{ACK,HP}) \cdot \beta_{offset}^{PUSCH} \cdot}{\sum_{l=0}^{N_{symb,all}^{PUSCH}-1} M_{sc}^{UCI}(l)}\right\rceil, \left\lceil\alpha_3 \cdot \sum_{l=0}^{N_{symb,all}^{PUSCH}-1} M_{sc}^{UCI}(l)\right\rceil\right\} \quad (10)$$

where $\alpha_3$ is the third control factor, $O_{ACK,HP}$ is the number of bits of the target HARQ-ACK, $L_{ACK,HP}$ is the number of CRC bits corresponding to the target HARQ-ACK, $\beta_{offset}^{PUSCH}$ is a parameter for calculating the number of coded modulation symbols used when the second-priority HARQ-ACK is transmitted on the second-priority PUSCH, $M_{sc}^{UCI}(l)$ is the number of resource elements REs available for transmitting UCI in an OFDM symbol l transmitted on the target PUSCH, l=0, 1, 2, . . . , $N_{symb,all}^{PUSCH}-1$, $N_{symb,all}^{PUSCH}$ is the total number of OFDM symbols of the target PUSCH inclusive of an OFDM symbol used for transmitting a DMRS, in a case that DCI scheduling the target PUSCH instructs the terminal not to transmit an r-th transport block, $K_r=0$, or else, $K_r$ is a size of an r-th transport block of the uplink service information on the target PUSCH, and $C_{UL-SCH}$ is the number of transport blocks of the uplink service information on the target PUSCH.

In another possible implementation, in a case that there is uplink service information on the target PUSCH and that the priority of the target PUSCH is the second priority, for second-priority target CSI included in the second target UCI, the number $Q'_{CSI-1,HP}$ of coded modulation symbols per layer when a CSI-part1 in the target CSI is multiplexed on the target PUSCH, and the number $Q'_{CSI-2,HP}$ of coded modulation symbols per layer when a CSI-part2 in the target CSI is multiplexed on the target PUSCH are determined according to the following formulas:

$$Q'_{CSI-1,HP} = \min\left\{\left\lceil\frac{(O_{CSI-1,HP} + L_{CSI-1,HP}) \cdot \beta_{offset}^{PUSCH} \cdot}{\sum_{l=0}^{N_{symb,all}^{PUSCH}-1} M_{sc}^{UCI}(l)}\right\rceil,\right.$$
$$\left.\left\lceil\alpha_3 \cdot \sum_{l=0}^{N_{symb,all}^{PUSCH}-1} M_{sc}^{UCI}(l)\right\rceil - Q'_{ACK/CG-UCI,HP}\right\} \quad \text{and} \quad (11)$$

$$Q'_{CSI-2,HP} = \min\left\{\left\lceil\frac{(O_{CSI-2,HP} + L_{CSI-2,HP}) \cdot \beta_{offset}^{PUSCH} \cdot}{\sum_{l=0}^{N_{symb,all}^{PUSCH}-1} M_{sc}^{UCI}(l)}\right\rceil,\right.$$
$$\left.\left\lceil\alpha_3 \cdot \sum_{l=0}^{N_{symb,all}^{PUSCH}-1} M_{sc}^{UCI}(l)\right\rceil - Q'_{ACK/CG-UCI,HP} - Q'_{CSI-1,HP}\right\} \quad (12)$$

where in a case that there is no CG-UCI on the target PUSCH and that a second-priority HARQ-ACK is transmitted on the target PUSCH, $Q'_{ACK/CG-UCI,LP}=Q'_{ACK,HP}$ in a case that a second-priority HARQ-ACK and CG-UCI are simultaneously transmitted on the target PUSCH, $Q'_{ACK/CG-UCI,HP}=Q'_{ACK+CG-UCI,HP}$; or in a case that CG-UCI is transmitted on the target PUSCH, but no second-priority HARQ-ACK is transmitted on the target PUSCH, $Q'_{ACK/CG-UCI,HP}=Q'_{CG-UCI}$;

where $Q'_{ACK,HP}$ is the number of coded modulation symbols per layer when the second-priority HARQ-ACK is multiplexed on the target PUSCH, and optionally, may be determined according to the foregoing formula (10); $Q'_{ACK+CG-UCI,HP}$ is the number of coded modulation symbols per layer when the second-priority HARQ-ACK and the CG-UCI are multiplexed on the target PUSCH, and optionally, may be determined by using a formula similar to the foregoing formula (10), where, for example, $O_{ACK,HP}$ in the formula (10) is replaced with a sum $O_{ACK+CG-UCI}$ of the number of bits of the target HARQ-ACK and the number of bits of the CG-UCI, $L_{ACK,HP}$ is replaced with a sum $L_{ACK+CG-UCI}$ of the number of CRC bits corresponding to the target HARQ-ACK and the number of CRC bits corresponding to the CG-UCI, and $\beta_{offset}^{PUSCH}$ is replaced with a parameter for calculating the number of coded modulation symbols used when the second-priority HARQ-ACK and the CG-UCI are transmitted on the second-priority PUSCH; and $Q'_{CG-UCI}$ is the number of coded modulation symbols per layer when the CG-UCI is transmitted on the target PUSCH, and optionally, may be determined by using a manner similar to the foregoing formula (10), where, for example, $O_{ACK,HP}$ in the formula (10) is replaced with the number $O_{CG-UCI}$ of bits of the CG-UCI, $L_{ACK,HP}$ is replaced with the number $L_{CG-UCI}$ of CRC bits corresponding to the CG-UCI, and $\beta_{offset}^{PUSCH}$ in the formula (10) is replaced with a parameter for calculating the number of coded modulation symbols used when the CG-UCI is transmitted on the second-priority PUSCH; for example, $Q'_{CG-UCI}$ may be determined by using the following formula (10'):

$$Q'_{CG-UCI} = \min\left\{\left\lceil\frac{(O_{CG-UCI} + L_{CG-UCI}) \cdot \beta_{offset}^{PUSCH} \cdot}{\sum_{l=0}^{N_{symb,all}^{PUSCH}-1} M_{sc}^{UCI}(l)}\right\rceil, \left\lceil\alpha \cdot \sum_{l=0}^{N_{symb,all}^{PUSCH}-1} M_{sc}^{UCI}(l)\right\rceil\right\} \quad (10')$$

where $\alpha$ is a control factor for limiting the number of coded modulation symbols used when the CG-UCI is transmitted on the second-priority PUSCH, and optionally, may be $\alpha_3$, and a corresponding parameter is $\beta_{offset}^{PUSCH}=\beta_{offset}^{CG-UCI}$.

In the foregoing formulas (11) and (12), $\alpha_3$ is the third control factor, $M_{sc}^{UCI}(l)$ is the number of resource elements REs available for transmitting UCI in an OFDM symbol l transmitted on the target PUSCH, l=0, 1, 2, . . . , $N_{symb,all}^{PUSCH}-1$, $N_{symb,all}^{PUSCH}$ is the total number of OFDM symbols of the target PUSCH inclusive of an OFDM symbol used for transmitting a DMRS, in a case that DCI scheduling the target PUSCH instructs the terminal not to transmit an r-th transport block, $K_r=0$, or else, $K_r$ is a size of an r-th transport block of the uplink service information on the target PUSCH, $C_{UL-SCH}$ is the number of transport blocks of the uplink service information on the target PUSCH, $O_{CSI-1,HP}$ is the number of bits of the CSI-part1, $L_{CSI-1,HP}$ is the number of CRC bits corresponding to the CSI-part1, $\beta_{offset}^{PUSCH}$ is a parameter for calculating the number of coded modulation symbols used when the second-priority HARQ-ACK is transmitted on the second-priority PUSCH, $O_{CSI-2,HP}$ is the number of bits of the CSI-part2, and $L_{CSI-2,HP}$ is the number of CRC bits corresponding to the CSI-part2.

In another possible implementation, in a case that there is uplink service information on the target PUSCH and that the priority of the target PUSCH is the second priority, for a first-priority target HARQ-ACK in the first target UCI, the number $Q'_{ACK,LP}$ of coded modulation symbols per layer when the target HARQ-ACK is multiplexed on the target PUSCH is determined according to the following formula:

$$Q'_{ACK,LP} = \min\left\{ \left\lceil \frac{(O_{ACK,LP} + L_{ACK,LP}) \cdot \beta_{offset}^{PUSCH}}{\sum_{r=0}^{C_{UL-SCH}-1} K_r} \right\rceil, \max \right. \quad (13)$$

$$\left. \left\{ \left[ \alpha_4 \cdot \sum_{l=l_0}^{N_{symb,all}^{PUSCH}-1} M_{sc}^{UCI}(l) \right] - Q'_{ACK,HP} - Q'_{CSI-1,HP} - Q'_{CSI-2,HP}, 0 \right\} \right\} \text{ or }$$

$$Q'_{ACK,LP} = \min\left\{ \left\lceil \frac{(O_{ACK,LP} + L_{ACK,LP}) \cdot \beta_{offset}^{PUSCH}}{\sum_{r=0}^{C_{UL-SCH}-1} K_r} \right\rceil, \right. \quad (14)$$

$$\left. \left[ \alpha_4 \cdot \left( \sum_{l=l_0}^{N_{symb,all}^{PUSCH}-1} M_{sc}^{UCI}(l) - Q'_{ACK,HP} - Q'_{CSI-1,HP} - Q'_{CSI-2,HP} \right) \right] \right\}$$

where $\alpha_4$ is the fourth control factor, $O_{ACK,LP}$ is the number of bits of the target HARQ-ACK, $L_{ACK,LP}$ is the number of CRC bits corresponding to the target HARQ-ACK, $\beta_{offset}^{PUSCH}$ is a parameter for calculating the number of coded modulation symbols used when the first-priority HARQ-ACK is transmitted on the second-priority PUSCH, $M_{sc}^{UCI}(l)$ is the number of resource elements REs available for transmitting UCI in an OFDM symbol l transmitted on the target PUSCH, l=0, 1, 2, . . . , $N_{symb,all}^{PUSCH}-1$, $N_{symb,all}^{PUSCH}$ is the total number of OFDM symbols of the target PUSCH inclusive of an OFDM symbol used for transmitting a DMRS, in a case that DCI scheduling the target PUSCH instructs the terminal not to transmit an r-th transport block, $K_r=0$, or else, $K_r$ is a size of an r-th transport block of the uplink service information on the target PUSCH, and $C_{UL-SCH}$ is the number of transport blocks of the uplink service information on the target PUSCH; $Q'_{ACK,HP}$ is the number of coded modulation symbols per layer when a second-priority HARQ-ACK is multiplexed on the target PUSCH, and may be determined according to the foregoing formula (10); $Q'_{CSI-1,HP}$ is the number of coded modulation symbols per layer when a second-priority CSI-part1 is multiplexed on the target PUSCH, and may be determined according to the foregoing formula (11); and $Q'_{CSI-2,HP}$ is the number of coded modulation symbols per layer when a second-priority CSI-part2 is multiplexed on the target PUSCH, and may be determined according to the foregoing formula (12).

In still another possible implementation, in a case that there is uplink service information on the target PUSCH and that the priority of the target PUSCH is the second priority, for first-priority target CSI in the first target UCI, the number $Q'_{CSI-1,LP}$ of coded modulation symbols per layer when a CSI-part1 in the target CSI is multiplexed on the target PUSCH, and the number $Q'_{CSI-2,LP}$ of coded modulation symbols per layer when a CSI-part2 in the target CSI is multiplexed on the target PUSCH are determined according to the following formulas:

$Q'_{CSI-1,LP}$ is:

$$Q'_{CSI-1,HP} = \min\left\{ \left\lceil \frac{(O_{CSI-1,HP} + L_{CSI-1,HP}) \cdot \beta_{offset}^{PUSCH}}{\sum_{r=0}^{C_{UL-SCH}-1} K_r} \right\rceil, \right. \quad (15)$$

$$\left. \max\left\{ \left[ \alpha_4 \cdot \sum_{l=0}^{N_{symb,all}^{PUSCH}-1} M_{sc}^{UCI}(l) \right] - Q'_{ACK,HP} - \right. \right.$$

$$\left. \left. Q'_{CSI-1,HP} - Q'_{CSI-2,HP} - Q'_{ACK/CG-UCI,LP}, 0 \right\} \right\} \text{ or}$$

(16)

$$Q'_{CSI-1,LP} =$$

$$\min\left\{ \left\lceil \frac{(O_{CSI-1,LP} + L_{CSI-1,LP}) \cdot \beta_{offset}^{PUSCH}}{\sum_{r=0}^{C_{UL-SCH}-1} K_r} \right\rceil, \left[ \alpha_4 \cdot \left( \sum_{l=l_0}^{N_{symb,all}^{PUSCH}-1} M_{sc}^{UCI}(l) - \right. \right. \right.$$

$$\left. \left. \left. Q'_{ACK,HP} - Q'_{CSI-1,HP} - Q'_{CSI-2,HP} - Q_{ACK/CG-UCI,LP} \right) \right] \right\}$$

and $Q'_{CSI-2,LP}$ is:

$$Q'_{CSI-2,LP} = \min\left\{ \left\lceil \frac{(O_{CSI-2,LP} + L_{CSI-2,LP}) \cdot \beta_{offset}^{PUSCH}}{\sum_{r=0}^{C_{UL-SCH}-1} K_r} \right\rceil, \right. \quad (17)$$

$$\left. \max\left\{ \left[ \alpha_4 \cdot \sum_{l=0}^{N_{symb,all}^{PUSCH}-1} M_{sc}^{UCI}(l) \right] - Q'_{ACK,HP} - \right. \right.$$

$$\left. \left. Q'_{CSI-1,HP} - Q'_{CSI-2,HP} - Q'_{ACK/CG-UCI,LP}, 0 \right\} \right\} \text{ or}$$

(18)

$$Q'_{CSI-2,LP} =$$

-continued $$\min\left\{\left[\frac{(O_{CSI-2,LP} + L_{CSI-2,LP}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r}\right], \left[\alpha_4 \cdot \left(\sum_{l=l_0}^{N_{symb,all}^{PUSCH}-1} M_{sc}^{UCI}(l) - Q'_{ACK,HP} - Q'_{CSI-1,HP} - Q'_{CSI-2,HP} - Q_{ACK/CG-UCI,LP}\right)\right]\right\}$$

where in a case that there is no CG-UCI on the target PUSCH and that a first-priority HARQ-ACK is transmitted on the target PUSCH, $Q'_{ACK/CG-UCI,LP} = Q'_{ACK,LP}$; in a case that a first-priority HARQ-ACK and CG-UCI are simultaneously transmitted on the target PUSCH, $Q'_{ACK/CG-UCI,LP} = Q'_{ACK+CG-UCI,LP}$; or in a case that CG-UCI is transmitted on the target PUSCH, but no first-priority HARQ-ACK is transmitted on the target PUSCH, $Q'_{ACK/CG-UCI,LP} = Q'_{CG-UCI}$;

where $Q'_{ACK,LP}$ is the number of coded modulation symbols per layer when the first-priority HARQ-ACK is multiplexed on the target PUSCH, and optionally, may be determined according to the foregoing formula (13) or (14); $Q'_{ACK+CG-UCI,LP}$ is the number of coded modulation symbols per layer when the first-priority HARQ-ACK and the CG-UCI are multiplexed on the target PUSCH, and optionally, may be determined by using a formula similar to the foregoing formula (13) or (14), where, for example, $O_{ACK,LP}$ in the formula (13) or (14) is replaced with a sum $O_{ACK+CG-UCI}$ of the number of bits of the first-priority target HARQ-ACK and the number of bits of the CG-UCI, $L_{ACK,LP}$ is replaced with a sum $L_{ACK+CG-UCI}$ of the number of CRC bits corresponding to the target HARQ-ACK and the number of CRC bits corresponding to the CG-UCI, and $\beta_{offset}^{PUSCH}$ in the formula (13) or (14) is replaced with a parameter for calculating the number of coded modulation symbols used when the first-priority HARQ-ACK and the CG-UCI are transmitted on the second-priority PUSCH; and $Q'_{CG-UCI}$ is the number of coded modulation symbols per layer when the CG-UCI is transmitted on the target PUSCH, and optionally, may be determined by using a formula similar to the foregoing formula (13) or (14), where, for example, $O_{ACK,LP}$ in the formula (13) or (14) is replaced with the number $O_{CG-UCI}$ of bits of the CG-UCI, $L_{ACK,LP}$ is replaced with the number $L_{CG-UCI}$ of CRC bits corresponding to the CG-UCI, and offset in the formula (13) or (14) is replaced with a parameter for calculating the number of coded modulation symbols used when the CG-UCI is transmitted on the second-priority PUSCH.

In the foregoing formulas (15) to (18), $\alpha_4$ is the fourth control factor, $M_{sc}^{UCI}(l)$ is the number of resource elements REs available for transmitting UCI in an OFDM symbol l transmitted on the target PUSCH, l=0, 1, 2, . . . , $N_{symb,all}^{PUSCH}-1$, $N_{symb,all}^{PUSCH}$ is the total number of OFDM symbols of the target PUSCH inclusive of an OFDM symbol used for transmitting a DMRS, in a case that DCI scheduling the target PUSCH instructs the terminal not to transmit an r-th transport block, $K_r=0$, or else, $K_r$ is a size of an r-th transport block of the uplink service information on the target PUSCH, $C_{UL-SCH}$ is the number of transport blocks of the uplink service information on the target PUSCH, $O_{CSI-1,LP}$ is the number of bits of the CSI-part1, $L_{CSI-1,LP}$ is the number of CRC bits corresponding to the CSI-part1, $\beta_{offset}^{PUSCH}$ is a parameter for calculating the number of coded modulation symbols used when the first-priority CSI is transmitted on the second-priority PUSCH, $O_{CSI-2,LP}$ is the number of bits of the CSI-part2, and $L_{CSI-2,LP}$ is the number of CRC bits corresponding to the CSI-part2; $Q'_{ACK,HP}$ is the number of coded modulation symbols per layer when a second-priority HARQ-ACK is multiplexed on the target PUSCH, and may be determined according to the foregoing formula (10); $Q'_{CSI-1,HP}$ is the number of coded modulation symbols per layer when a second-priority CSI-part1 is multiplexed on the target PUSCH, and may be determined according to the foregoing formula (11); and $Q'_{CSI-2,HP}$ is the number of coded modulation symbols per layer when a second-priority CSI-part2 is multiplexed on the target PUSCH, and may be determined according to the foregoing formula (12).

In the foregoing possible implementation, in a case that only one of the first-priority CSI and second-priority CSI is capable of being multiplexed on the target PUSCH, values of $Q'_{CSI-1,LP}$ and $Q'_{CSI-2,LP}$ are 0.

It should be noted that, although the number of coded modulation symbols per layer for the UCI is determined in an order of an HP HARQ-ACK, an LP HARQ-ACK, HP CSI, and LP CSI in the foregoing implementations, this is not limited. Alternatively, the number of coded modulation symbols per layer for the UCI may be determined in an order of an HP HARQ-ACK, HP CSI, an LP HARQ-ACK, and LP CSI. Details are not described in this embodiment of this application again.

(II) There is no uplink service information on the target PUSCH.

On an LP PUSCH or HP PUSCH without UL-SCH, an HP HARQ-ACK or LP HARQ-ACK and LP CSI may be multiplexed.

The following separately describes manners of determining the number of coded modulation symbols when UCI is multiplexed on the LP PUSCH (the first-priority PUSCH) and the HP PUSCH (with the second priority).

1. The priority of the target PUSCH is the first priority.

In a possible implementation, in a case that there is no uplink service information on the target PUSCH and that the priority of the target PUSCH is the first priority, for a second-priority target HARQ-ACK in the second target UCI, the number $Q'_{ACK,HP}$ of coded modulation symbols per layer when the target HARQ-ACK is multiplexed on the target PUSCH is determined according to the following formula:

$$Q'_{ACK,LP} = \min\left\{\left[\frac{(O_{ACK,HP} + L_{ACK,HP}) \cdot \beta_{offset}^{PUSCH}}{R \cdot Q_m}\right], \left[\alpha_2 \cdot \sum_{l=l_0}^{N_{symb,all}^{PUSCH}-1} M_{sc}^{UCI}(l)\right]\right\} \quad (19)$$

where $\alpha_2$ is the second control factor, $O_{ACK,HP}$ is the number of bits of the target HARQ-ACK, $L_{ACK,HP}$ is the number of CRC bits corresponding to the target HARQ-ACK, $\beta_{offset}^{PUSCH}$ is a parameter for calculating the number of coded modulation symbols used when the second-priority HARQ-ACK is transmitted on the first-priority PUSCH, $M_{sc}^{UCI}(l)$ is the number of resource elements REs available for transmitting UCI in an OFDM symbol l transmitted on the target PUSCH, l=0, 1, 2, . . . , $N_{symb,all}^{PUSCH}-1$, $N_{symb,all}^{PUSCH}$ is the total number of OFDM symbols of the target PUSCH inclusive of an OFDM symbol used for transmitting a DMRS, R is a bit rate of the target PUSCH, and $Q_m$ is a modulation and coding order of the target PUSCH.

In another possible implementation, in a case that there is no uplink service information on the target PUSCH and that the priority of the target PUSCH is the first priority, for a first-priority HARQ-ACK in the first target UCI, the number $Q'_{ACK,LP}$ of coded modulation symbols per layer when the target HARQ-ACK is multiplexed on the target PUSCH is determined according to the following formula:

$$Q'_{ACK,LP} = \min\left\{\left\lceil \frac{(O_{ACK,HP} + L_{ACK,HP}) \cdot \beta^{PUSCH}_{offset}}{R \cdot Q_m} \right\rceil,\right. \quad (20)$$

$$\left.\max\left\{\left[\alpha_1 \cdot \sum_{l=l_0}^{N^{PUSCH}_{symb,all}-1} M^{UCI}_{sc}(l)\right] - Q'_{ACK,HP}, 0\right\}\right\} \text{ or}$$

$$Q'_{ACK,LP} = \min\left\{\left\lceil \frac{(O_{ACK,LP} + L_{ACK,LP}) \cdot \beta^{PUSCH}_{offset}}{R \cdot Q_m} \right\rceil,\right. \quad (21)$$

$$\left.\left[\alpha_1 \cdot \left(\sum_{l=l_0}^{N^{PUSCH}_{symb,all}-1} M^{UCI}_{sc}(l) - Q'_{ACK,HP}\right)\right]\right\}$$

where $\alpha_1$ is the first control factor, $O_{ACK,LP}$ is the number of bits of the target HARQ-ACK, $L_{ACK,LP}$ is the number of CRC bits corresponding to the target HARQ-ACK, $\beta^{PUSCH}_{offset}$ is a parameter for calculating the number of coded modulation symbols used when the first-priority HARQ-ACK is transmitted on the first-priority PUSCH, $M^{UCI}_{sc}(l)$ is the number of resource elements REs available for transmitting UCI in an OFDM symbol l transmitted on the target PUSCH, l=0, 1, 2, ..., $N^{PUSCH}_{symb,all}-1$, $N^{PUSCH}_{symb,all}$ is the total number of OFDM symbols of the target PUSCH inclusive of an OFDM symbol used for transmitting a DMRS, R is a bit rate of the target PUSCH, $Q_m$ is a modulation and coding order of the target PUSCH, and $Q'_{ACK,HP}$ is the number of coded modulation symbols per layer when a second-priority HARQ-ACK is multiplexed on the target PUSCH, and may be determined according to the formula (19).

In another possible implementation, in a case that there is no uplink service information on the target PUSCH and that the priority of the target PUSCH is the first priority, for first-priority target CSI in the first target UCI, the number of coded modulation symbols per layer when the target CSI is multiplexed on the target PUSCH is determined according to the following formula:

in a case that the target CSI includes a CSI-part1 and a CSI-part2, the number of coded modulation symbols per layer for the target CSI includes $Q'_{CSI-1,LP}$ and $Q'_{CSI-2,LP}$, and $$Q'_{CSI-1,LP} = \min\left\{\left\lceil \frac{(O_{CSI-1,LP} + L_{CSI-1,LP}) \cdot \beta^{PUSCH}_{offset}}{R \cdot Q_m} \right\rceil,\right. \quad (22)$$

$$\left.\sum_{l=0}^{N^{PUSCH}_{symb,all}-1} M^{UCI}_{sc}(l) - Q'_{ACK,HP} - Q'_{ACK,LP}\right\} \text{ and}$$

$$Q'_{CSI-2,LP} = \sum_{l=0}^{N^{PUSCH}_{symb,all}-1} M^{UCI}_{sc}(l) - Q'_{ACK,HP} - Q'_{ACK,LP} - Q'_{CSI-1,LP} \quad (23)$$

if the target CSI includes only a CSI-part1, the number of coded modulation symbols per layer for the target CSI includes $Q'_{CSI-1,LP}$, and $$Q'_{CSI-1,LP} = \sum_{l=0}^{N^{PUSCH}_{symb,all}-1} M^{UCI}_{sc}(l) - Q'_{ACK,HP} - Q'_{ACK,LP} \quad (24)$$

where $O_{CSI-1,LP}$ is the number of bits of the CSI-part1, and $L_{CSI-1,LP}$ is the number of CRC bits corresponding to the CSI-part1.

2. The Priority of the target PUSCH is the second priority.

For an HP PUSCH without UL-SCH, one or more of an HP HARQ-ACK, an LP HARQ-ACK, and HP CSI (which may include a CSI part 1 and a CSI part 2) may be multiplexed on the PUSCH, and the number of coded modulation symbols per layer for the UCI is determined respectively according to the following implementations.

In a possible implementation, in a case that there is no uplink service information on the target PUSCH and that the priority of the target PUSCH is the second priority, for a second-priority target HARQ-ACK in the second target UCI, the number $Q'_{ACK,HP}$ of coded modulation symbols per layer when the target HARQ-ACK is multiplexed on the target PUSCH may be determined according to the following formula:

$$Q'_{ACK,HP} = \quad (25)$$

$$\min\left\{\left\lceil \frac{(O_{ACK,HP} + L_{ACK,HP}) \cdot \beta^{PUSCH}_{offset}}{R \cdot Q_m} \right\rceil, \left[\alpha_3 \cdot \sum_{l=l_0}^{N^{PUSCH}_{symb,all}-1} M^{UCI}_{sc}(l)\right]\right\}$$

where $\alpha_3$ is the third control factor, $O_{ACK,HP}$ is the number of bits of the target HARQ-ACK, $L_{ACK,HP}$ is the number of CRC bits corresponding to the target HARQ-ACK, $\beta^{PUSCH}_{offset}$ is a parameter for calculating the number of coded modulation symbols used when the second-priority HARQ-ACK is transmitted on the second-priority PUSCH, $M^{UCI}_{sc}(l)$ is the number of resource elements REs available for transmitting UCI in an OFDM symbol l transmitted on the target PUSCH, l=0, 1, 2, ..., $N^{PUSCH}_{symb,all}-1$, $N^{PUSCH}_{symb,all}$ is the total number of OFDM symbols of the target PUSCH inclusive of an OFDM symbol used for transmitting a DMRS, R is a bit rate of the target PUSCH, and $Q_m$ is a modulation and coding order of the target PUSCH.

For an LP HARQ-ACK and HP CSI multiplexed on the target PUSCH, the number of coded modulation symbols per layer for the LP HARQ-ACK may be determined first, and then the number of coded modulation symbols per layer for the HP CSI is determined; or the number of coded modulation symbols per layer for the HP CSI may be first determined, and then the number of coded modulation symbols per layer for the LP HARQ-ACK is determined. The following describes the two manners separately.

(1) First determining the number of coded modulation symbols per layer for the LP HARQ-ACK, and then determining the number of coded modulation symbols per layer for the HP CSI In a possible implementation, in a case that there is no uplink service information on the target PUSCH and that the priority of the target PUSCH is the second priority, for a first-priority target HARQ-ACK in the first target UCI, the number $Q'_{ACK,LP}$ of coded modulation symbols per layer when the first-priority target HARQ-ACK is multiplexed on the target PUSCH is determined according to the following formula:

$$Q'_{ACK,LP} = \min\left\{\left\lceil\frac{(O_{ACK,LP} + L_{ACK,LP}) \cdot \beta_{offset}^{PUSCH}}{R \cdot Q_m}\right\rceil,\right.\tag{27}$$

$$\left.\max\left\{\left[\alpha_4 \cdot \sum_{l=l_0}^{N_{symb,all}^{PUSCH}-1} M_{sc}^{UCI}(l)\right] - Q'_{ack,HP}, 0\right\}\right\} \text{ or }$$

$$Q'_{ACK,LP} = \min$$

$$\left\{\left\lceil\frac{(O_{ACK,LP} + L_{ACK,LP}) \cdot \beta_{offset}^{PUSCH}}{R \cdot Q_m}\right\rceil, \left[\alpha_4 \cdot \left(\sum_{l=l_0}^{N_{symb,all}^{PUSCH}-1} M_{sc}^{UCI}(l) - Q'_{ack,HP}\right)\right]\right\}$$

where $\alpha_4$ is the fourth control factor, $O_{ACK,LP}$ is the number of bits of the first-priority target HARQ-ACK, and $L_{ACK,LP}$ is the number of CRC bits corresponding to the first-priority target HARQ-ACK; and $Q'_{ACK,HP}$ is the number of coded modulation symbols per layer when the second-priority HARQ-ACK is multiplexed on the target PUSCH, and may be determined according to the foregoing formula (25).

In another possible implementation, in a case that there is no uplink service information on the target PUSCH and that the priority of the target PUSCH is the second priority, for second-priority target CSI in the second target UCI, the number of coded modulation symbols per layer when the target CSI is multiplexed on the target PUSCH is determined according to the following formula:

in a case that the target CSI includes a CSI-part1 and a CSI-part2, the number of coded modulation symbols per layer for the target CSI includes $Q'_{CSI-1,HP}$ and $Q'_{CSI-2,HP}$, and $$Q'_{CSI-1,HP} = \min\left\{\left\lceil\frac{(O_{CSI-1,LP} + L_{CSI-1,LP}) \cdot \beta_{offset}^{PUSCH}}{R \cdot Q_m}\right\rceil,\right.\tag{28}$$

$$\left.\sum_{l=0}^{N_{symb,all}^{PUSCH}-1} M_{sc}^{UCI}(l) - Q'_{ACK,HP} - Q'_{ACK,LP}\right\} \text{ and }$$

$$Q'_{CSI-2,HP} = \sum_{l=0}^{N_{symb,all}^{PUSCH}-1} M_{sc}^{UCI}(l) - Q'_{ACK,HP} - Q'_{ACK,LP} - Q'_{CSI-1,LP}\tag{29}$$

or if the target CSI includes only a CSI-part1, the number of coded modulation symbols per layer for the target CSI includes $Q'_{CSI-1,HP}$ and $$Q'_{CSI-1,HP} = \sum_{l=0}^{N_{symb,all}^{PUSCH}-1} M_{sc}^{UCI}(l) - Q'_{ACK,HP} - Q'_{ACK,LP}\tag{30}$$

where $O_{CSI-1,LP}$ is the number of bits of the CSI-part1, and $L_{CSI-1,LP}$ is the number of CRC bits corresponding to the CSI-part1; $Q'_{ACK,HP}$ is the number of coded modulation symbols per layer when the second-priority HARQ-ACK is multiplexed on the target PUSCH, and may be determined according to the foregoing formula (25); and $Q'_{ACK,LP}$ is the number of coded modulation symbols per layer when the first-priority target HARQ-ACK is multiplexed on the target PUSCH, and may be determined according to the foregoing formula (26) or (27).

(2) First determining the number of coded modulation symbols per layer for the HP CSI, and then determining the number of coded modulation symbols per layer for the LP HARQ-ACK In a possible implementation, in a case that there is no uplink service information on the target PUSCH and that the priority of the target PUSCH is the second priority, for second-priority target CSI in the second target UCI, the number of coded modulation symbols per layer when the target CSI is multiplexed on the target PUSCH is determined according to the following formula:

in a case that the target CSI includes a CSI-part1 and a CSI-part2, the number of coded modulation symbols per layer for the target CSI includes $Q'_{CSI-1,HP}$ and $Q'_{CSI-2,HP}$ and $$Q'_{CSI-1,HP} = \min\tag{31}$$

$$\left\{\left\lceil\frac{(O_{CSI-1,HP} + L_{CSI-1,HP}) \cdot \beta_{offset}^{PUSCH}}{R \cdot Q_m}\right\rceil, \sum_{l=0}^{N_{symb,all}^{PUSCH}-1} M_{sc}^{UCI}(l) - Q'_{ACK,HP}\right\}$$

and $$Q'_{CSI-2,HP} = \min\left\{\left\lceil\frac{O_{CSI-2,HP} + L_{CSI-2,HP}) \cdot \beta_{offset}^{PUSCH}}{R \cdot Q_m}\right\rceil,\right.\tag{32}$$

$$\left.\sum_{l=0}^{N_{symb,all}^{PUSCH}-1} M_{sc}^{UCI}(l) - Q'_{ACK,HP} - Q'_{CSI-1,HP}\right\}$$

or if the target CSI includes only a CSI-part1, the number of coded modulation symbols per layer for the target CSI includes $Q'_{CSI-1,HP}$, and $$Q'_{CSI-1,HP} = \sum_{l=0}^{N_{symb,all}^{PUSCH}-1} M_{sc}^{UCI}(l) - Q'_{ACK,HP}\tag{33}$$

where $O_{CSI-1,HP}$ is the number of bits of the CSI-part1, $L_{CSI-1,HP}$ is the number of CRC bits corresponding to the CSI-part1, $\beta_{offest}^{PUSCH}$ is a parameter for calculating the number of coded modulation symbols used when the second-priority CSI is transmitted on the second-priority PUSCH, $O_{CSI-2,HP}$ is the number of bits of the CSI-part2, and $L_{CSI-2,HP}$ is the number of CRC bits corresponding to the CSI-part2; and $Q'_{ACK,HP}$ is the number of coded modulation symbols per layer when the second-priority HARQ-ACK is multiplexed on the target PUSCH, and may be determined according to the foregoing formula (25).

In another possible implementation, in a case that there is no uplink service information on the target PUSCH and that the priority of the target PUSCH is the second priority, for a first-priority target HARQ-ACK in the first target UCI, the number $Q'_{ACK,LP}$ of coded modulation symbols per layer when the first-priority target HARQ-ACK is multiplexed on the target PUSCH is determined according to the following formula:

$$Q'_{ACK,LP} = \min\left\{\left\lceil\frac{(O_{ACK,LP} + L_{ACK,LP})\beta_{offset}^{PUSCH}}{R \cdot Q_m}\right\rceil, \max\right.\tag{34}$$

$$\left.\left\{\left[\alpha_4 \cdot \sum_{l=l_0}^{N_{symb,all}^{PUSCH}-1} M_{sc}^{UCI}(l)\right] - Q'_{ACK,HP} - Q'_{CSI-1,HP} - Q'_{CSI-2,HP}, 0\right\}\right\}$$

or $$Q'_{ACK,LP} = \sum_{l=l_0}^{N_{symb,all}^{PUSCH}-1} M_{sc}^{UCI}(l) - Q'_{ACK,HP} - Q'_{CSI-1,HP} - Q'_{CSI-2,HP}\tag{35}$$

where $\alpha_4$ is the fourth control factor, $O_{ACK,LP}$ is the number of bits of the target HARQ-ACK, and $L_{ACK,LP}$ is the number of CRC bits corresponding to the target HARQ-ACK; $Q'_{ACK,HP}$ is the number of coded modulation symbols per layer when the second-priority HARQ-ACK is multiplexed on the target PUSCH, and may be determined according to the foregoing formula (25); and if the second-priority CSI multiplexed on the target PUSCH does not include the CSI part2, $Q'_{CSI-1,HP}$ is determined according to the foregoing formula (33), and a value of $Q'_{CSI-2,HP}$ is 0; or if the second-priority CSI multiplexed on the target PUSCH includes the CSI part2, $Q'_{CSI-1,HP}$ is determined according to the foregoing formula (31), and $Q'_{CSI-2,HP}$ is determined according to the foregoing formula (32).

In the technical solution provided in this embodiment of this application, for multiplexing on PUCCHs and PUSCHs with different priorities, a method for calculating the number of coded modulation symbols per layer in a case that UCI with different priorities is multiplexed on PUSCHs with different priorities is provided, to improve effectiveness of the communications system.

An embodiment of this application further provides a CSI transmission method. The method provides a processing solution when HP CSI on a PUCCH and LP aperiodic CSI (Aperiodic CSI, A-CSI) on a PUSCH overlap in time domain resources.

The method includes one of the following processing manners.

Manner 1: When HP CSI on a PUCCH and LP aperiodic CSI (Aperiodic CSI, A-CSI) on a PUSCH overlap in time domain resources (that is, the PUCCH carrying the HP CSI and the LP PUSCH carrying the A-CSI overlap in time domain resources), transmission of the PUSCH is canceled, and only the PUCCH carrying the HP CSI is transmitted.

Manner 2: When HP CSI on a PUCCH and LP aperiodic CSI (Aperiodic CSI, A-CSI) on a PUSCH overlap in time domain resources (that is, the PUCCH carrying the HP CSI and the LP PUSCH carrying the A-CSI overlap in time domain resources), if the PUSCH includes uplink service information, the HP CSI is multiplexed on the PUSCH for transmission, and the LP A-CSI is discarded; or if the PUSCH does not include uplink service information, transmission of the PUSCH is canceled, and only the PUCCH carrying the HP CSI is transmitted.

Manner 3: When HP CSI on a PUCCH and LP aperiodic CSI (Aperiodic CSI, A-CSI) on a PUSCH overlap in time domain resources (that is, the PUCCH carrying the HP CSI and the LP PUSCH carrying the A-CSI overlap in time domain resources), if a HARQ-ACK is multiplexed on the PUSCH, the HP CSI and the HARQ-ACK are multiplexed on the PUSCH for transmission, and the LP A-CSI is discarded.

That a HARQ-ACK is multiplexed on the PUSCH includes at least one of the following:
(1) the HP CSI and the HARQ-ACK are multiplexed on one PUCCH; and
(2) the PUCCH carrying the HARQ-ACK and the PUSCH overlap in time domain resources.

Optionally, a priority of the HARQ-ACK is a second priority.

An embodiment of this application further provides a CSI transmission method. The method provides a processing solution when HP CSI on a PUCCH and semi-persistent CSI (SP-CSI) on an HP PUSCH overlap in time domain resources. The method includes: when the PUCCH carrying the HP CSI and the HP PUSCH carrying the SP-CSI overlap in time domain resources, canceling transmission of the SP-CSI, and transmitting the PUCCH carrying the HP CSI.

It should be noted that the method for determining the number of coded modulation symbols according to this embodiment of this application may be performed by an apparatus for determining the number of coded modulation symbols, or a control module configured to perform the method for determining the number of coded modulation symbols in the apparatus for determining the number of coded modulation symbols. An apparatus for determining the number of coded modulation symbols according to an embodiment of this application is described by assuming that the method for determining the number of coded modulation symbols is performed by the apparatus for determining the number of coded modulation symbols in this embodiment of this application.

Figure 3:
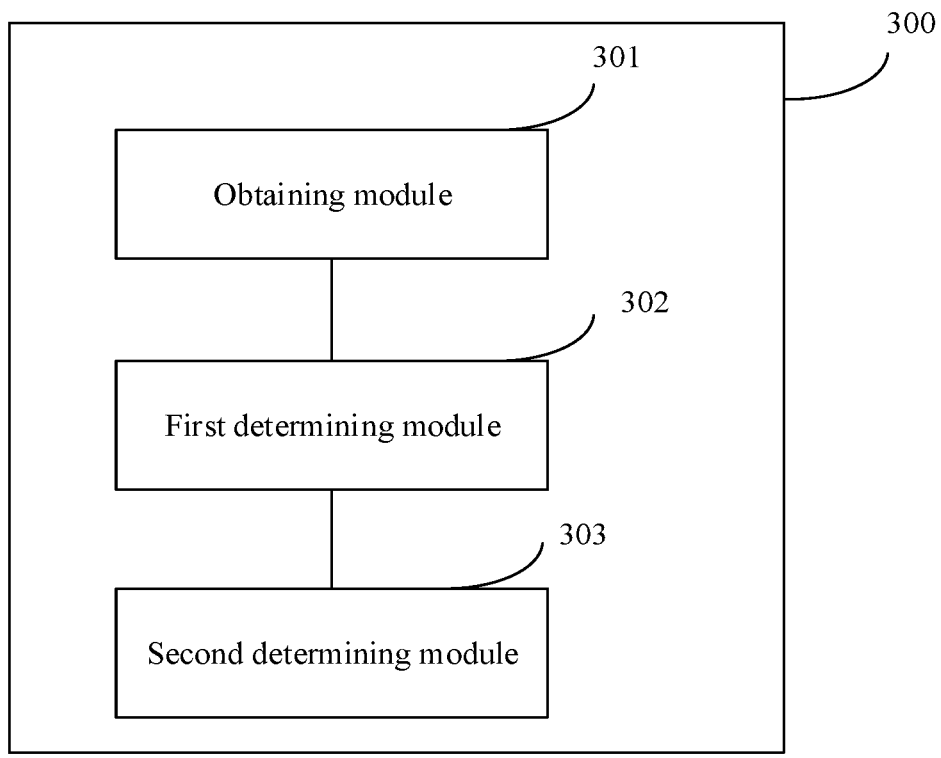
FIG. 3 is a schematic diagram of a structure of an apparatus for determining the number of coded modulation symbols according to an embodiment of this application.

FIG. 3 is a schematic diagram of a structure of an apparatus for determining the number of coded modulation symbols according to an embodiment of this application. As shown in FIG. 3, the apparatus 300 mainly includes an obtaining module 301, a first determining module 302, and a second determining module 303.

In this embodiment of this application, the obtaining module 301 is configured to obtain at least one control factor, where the control factor is used to limit a resource occupied when uplink control information UCI is multiplexed on a physical uplink shared channel PUSCH; the first determining module 302 is configured to determine first target UCI and second target UCI multiplexed on a target PUSCH for transmission, where a priority of the first target UCI is a first priority, a priority of the second target UCI is a second priority, and the first priority is lower than the second priority; and the second determining module 303 is configured to separately determine, according to a target control factor, the number of coded modulation symbols per layer in a case that the first target UCI and the second target UCI are multiplexed on the target PUSCH, where the target control factor is one or more of the at least one control factor.

In a possible implementation, in a case that UCI with different priorities is multiplexed on PUSCHs with different priorities, corresponding control factors are different.

In a possible implementation, the at least one control factor includes at least one of the following: a first control factor used to control a resource occupied when first-priority UCI is multiplexed on a first-priority PUSCH; a second control factor used to control a resource occupied when second-priority UCI is multiplexed on a first-priority PUSCH; a third control factor used to control a resource occupied when second-priority UCI is multiplexed on a second-priority PUSCH; and a fourth control factor used to control a resource occupied when first-priority UCI is multiplexed on a second-priority PUSCH.

In a possible implementation, the separately determining, by the second determining module 303 according to a target control factor, the number of coded modulation symbols per layer in a case that the first target UCI and the second target UCI are multiplexed on the target PUSCH includes: separately determining, in the following order, the number of coded modulation symbols per layer in a case that the first target UCI and the second target UCI are multiplexed on the target PUSCH:

first determining the number of coded modulation symbols per layer in a case that high-priority UCI is multiplexed on the target PUSCH, and then determining the number of coded modulation symbols per layer in a case that low-priority UCI is multiplexed on the target PUSCH, where in a case that UCI with a same priority includes different types of UCI, the number of coded modulation symbols per layer when hybrid automatic repeat request acknowledgement HARQ-ACK information is multiplexed on the target PUSCH is first determined, and then the number of coded modulation symbols per layer when channel state information CSI is multiplexed on the target PUSCH is determined; or first determining the number of coded modulation symbols per layer when hybrid automatic repeat request acknowledgement HARQ-ACK information is multiplexed on the target PUSCH, and then determining the number of coded modulation symbols per layer when channel state information CSI is multiplexed on the target PUSCH, where in a case that a same type of UCI includes UCI with different priorities, the number of coded modulation symbols per layer in a case that high-priority UCI is multiplexed on the target PUSCH is first determined, and then the number of coded modulation symbols per layer in a case that low-priority UCI is multiplexed on the target PUSCH is determined.

In a possible implementation, the separately determining, by the second determining module 303 according to a target control factor, the number of coded modulation symbols per layer in a case that the first target UCI and the second target UCI are multiplexed on the target PUSCH includes: in a case that there is uplink service information on the target PUSCH and that a priority of the target PUSCH is the first priority, determining, according to the following formula, for a second-priority target HARQ-ACK included in the second target UCI, the number $Q'_{ACK,HP}$ of coded modulation symbols per layer when the target HARQ-ACK is multiplexed on the target PUSCH:

$$Q'_{ACK,HP} = \min\left\{ \left\lceil \frac{(O_{ACK,HP} + L_{ACK,HP}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha_2 \cdot \sum_{l=l_0}^{N_{symb,all}^{PUSCH}-1} M_{sc}^{UCI}(l) \right\rceil \right\},$$

where $\alpha_2$ is the second control factor, $O_{ACK,HP}$ is the number of bits of the second-priority target HARQ-ACK, $L_{ACK,HP}$ is the number of CRC bits corresponding to the target HARQ-ACK, $\beta_{offest}^{PUSCH}$ is a parameter for calculating the number of coded modulation symbols used when the second-priority HARQ-ACK is transmitted on the first-priority PUSCH, $M_{sc}^{UCI}(l)$ is the number of resource elements REs available for transmitting UCI in an OFDM symbol l transmitted on the target PUSCH, l=0, 1, 2, ..., $N_{symb,all}^{PUSCH}-1$, $N_{symb,all}^{PUSCH}$ is the total number of OFDM symbols of the target PUSCH inclusive of an OFDM symbol used for transmitting a DMRS, in a case that downlink control information DCI scheduling the target PUSCH instructs a terminal not to transmit an r-th transport block, $K_r=0$, or else, $K_r$ is a size of an r-th transport block of the uplink service information on the target PUSCH, and $C_{UL-SCH}$ is the number of transport blocks of the uplink service information on the target PUSCH.

In a possible implementation, the separately determining, by the second determining module 303 according to a target control factor, the number of coded modulation symbols per layer in a case that the first target UCI and the second target UCI are multiplexed on the target PUSCH includes:

in a case that there is uplink service information on the target PUSCH and that a priority of the target PUSCH is the first priority, determining, according to the following formulas, for second-priority target CSI included in the second target UCI, the number $Q'_{CSI-1,HP}$ of coded modulation symbols per layer when a channel state information part 1 CSI-part1 in the target CSI is multiplexed on the target PUSCH, and the number $Q'_{CSI-2,HP}$ of coded modulation symbols per layer when a channel state information part 2 CSI-part2 in the target CSI is multiplexed on the target PUSCH:

$$Q'_{CSI-1,HP} = \min\left\{ \left\lceil \frac{(O_{CSI-1,HP} + L_{CSI-1,HP}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \right.$$

$$\left. \left\lceil \alpha_2 \cdot \sum_{l=0}^{N_{symb,all}^{PUSCH}-1} M_{sc}^{UCI}(l) \right\rceil - Q'_{ACK,HP} \right\}$$

and $$Q'_{CSI-2,HP} = \min\left\{ \left\lceil \frac{O_{CSI-2,HP} + L_{CSI-2,HP}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \right.$$

$$\left. \left\lceil \alpha_2 \cdot \sum_{l=0}^{N_{symb,all}^{PUSCH}-1} M_{sc}^{UCI}(l) \right\rceil - Q'_{ACK,HP} - Q'_{CSI-1,HP} \right\},$$

where $Q'_{ACK,HP}$ is the number of coded modulation symbols per layer when a second-priority HARQ-ACK is multiplexed on the target PUSCH, $\alpha_2$ is the second control factor, $M_{sc}^{UCI}(l)$ is the number of resource elements REs available for transmitting UCI in an OFDM symbol l transmitted on the target PUSCH, l=0, 1, 2, ..., $N_{symb,all}^{PUSCH}-1$, $N_{symb,all}^{PUSCH}$ is the total number of OFDM symbols of the target PUSCH inclusive of an OFDM symbol used for transmitting a DMRS, in a case that DCI scheduling the target PUSCH instructs a terminal not to transmit an r-th transport block, $K_r=0$, or else, $K_r$ is a size of an r-th transport block of the uplink service information on the target PUSCH, $C_{UL-SCH}$ is the number of transport blocks of the uplink service information on the target PUSCH, $O_{CSI-1,HP}$ is the number of bits of the CSI-part1, $L_{CSI-1,HP}$ is the number of CRC bits corresponding to the CSI-part1, $\beta_{offest}^{PUSCH}$ is a parameter for calculating the number of coded modulation symbols used when the second-priority CSI is transmitted on the first-priority PUSCH, $O_{CSI-2,HP}$ is the number of bits of the CSI-part2, and $L_{CSI-2,HP}$ is the number of CRC bits corresponding to the CSI-part2.

In a possible implementation, the separately determining, by the second determining module 303 according to a target control factor, the number of coded modulation symbols per layer in a case that the first target UCI and the second target UCI are multiplexed on the target PUSCH includes:

in a case that there is uplink service information on the target PUSCH and that a priority of the target PUSCH is the first priority, determining, according to the following formula, for a first-priority target HARQ-ACK included in the first target UCI, the number $Q'_{ACK,LP}$ of coded modulation symbols per layer when the target HARQ-ACK is multiplexed on the target PUSCH:

$$Q'_{ACK,LP} = \min\left\{\left\lceil \frac{(O_{ACK,LP} + L_{ACK,LP}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \max\left\{\left\lceil \alpha_1 \cdot \sum_{l=l_0}^{N_{symb,all}^{PUSCH}-1} M_{sc}^{UCI}(l) \right\rceil - Q'_{ACK,HP} - Q'_{CSI-1,HP} - Q'_{CSI-2,HP}, 0 \right\} \right\}$$

or $$Q'_{ACK,LP} = \min\left\{\left\lceil \frac{(O_{ACK,LP} + L_{ACK,LP}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left[\alpha_1 \cdot \left(\sum_{l=l_0}^{N_{symb,all}^{PUSCH}-1} M_{sc}^{UCI}(l) - Q'_{ACK,HP} - Q'_{CSI-1,HP} - Q'_{CSI-2,HP}\right)\right]\right\}$$

where $\alpha_1$ is the first control factor, $O_{ACK,LP}$ is the number of bits of the first-priority target HARQ-ACK, $L_{ACK,LP}$ is the number of CRC bits corresponding to the target HARQ-ACK, $\beta_{offest}^{PUSCH}$ is a parameter for calculating the number of coded modulation symbols used when the offset first-priority HARQ-ACK is transmitted on the first-priority PUSCH, $M_{sc}^{UCI}(l)$ is the number of resource elements REs available for transmitting UCI in an OFDM symbol l transmitted on the target PUSCH, l=0, 1, 2, ..., $N_{symb,all}^{PUSCH}-1$, $N_{symb,all}^{PUSCH}$ is the total number of OFDM symbols of the target PUSCH inclusive of an OFDM symbol used for transmitting a DMRS, in a case that DCI scheduling the target PUSCH instructs a terminal not to transmit an r-th transport block, $K_r=0$, or else, $K_r$ is a size of an r-th transport block of the uplink service information on the target PUSCH, $C_{UL-SCH}$ is the number of transport blocks of the uplink service information on the target PUSCH, $Q'_{ACK,HP}$ is the number of coded modulation symbols per layer when a second-priority HARQ-ACK is multiplexed on the target PUSCH, $Q'_{CSI-1,HP}$ is the number of coded modulation symbols per layer when a second-priority CSI-part1 is multiplexed on the target PUSCH, and $Q'_{CSI-2,HP}$ is the number of coded modulation symbols per layer when a second-priority CSI-part2 is multiplexed on the target PUSCH.

In a possible implementation, the separately determining, by the second determining module 303 according to a target control factor, the number of coded modulation symbols per layer in a case that the first target UCI and the second target UCI are multiplexed on the target PUSCH includes:

in a case that there is uplink service information on the target PUSCH and that a priority of the target PUSCH is the first priority, determining, according to the following formulas, for first-priority target CSI included in the first target UCI, the number $Q'_{CSI-1,LP}$ of coded modulation symbols per layer when a CSI-part1 in the target CSI is multiplexed on the target PUSCH, and the number $Q'_{CSI-2,LP}$ of coded modulation symbols per layer when a CSI-part2 in the target CSI is multiplexed on the target PUSCH:

$Q'_{CSI-1,LP}$ is:

$$Q'_{CSI-1,LP} = \min\left\{\left\lceil \frac{(O_{CSI-2,LP} + L_{CSI-2,LP}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \max\left\{\left\lceil \alpha_1 \cdot \sum_{l=0}^{N_{symb,all}^{PUSCH}-1} M_{sc}^{UCI}(l) \right\rceil - Q'_{ACK,HP} - Q'_{CSI-1,HP} - Q'_{CSI-2,HP} - Q'_{ACK/CG-UCI,LP}, 0 \right\}\right\}$$

or $$Q'_{CSI-1,LP} = \min\left\{\left\lceil \frac{(O_{CSI-1,LP} + L_{CSI-1,LP}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left[\alpha_1 \cdot \left(\sum_{l=0}^{N_{symb,all}^{PUSCH}-1} M_{sc}^{UCI}(l) - -Q'_{ACK,HP} - Q'_{CSI-1,HP} - Q'_{CSI-2,HP} - Q'_{ACK/CG-UCI,LP}\right)\right]\right\};$$

and $Q'_{CSI-2,LP}$ is:

$$Q'_{CSI-2,LP} = \min\left\{\left\lceil \frac{(O_{CSI-2,LP} + L_{CSI-2,LP}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \max\left\{\left\lceil \alpha_1 \cdot \sum_{l=0}^{N_{symb,all}^{PUSCH}-1} M_{sc}^{UCI}(l) \right\rceil - Q'_{ACK,HP} - Q'_{CSI-1,HP} - Q'_{CSI-2,HP} - Q'_{ACK/CG-UCI,LP}, 0 \right\}\right\},$$

or $$Q'_{CSI-2,LP} = \min\left\{\left\lceil \frac{(O_{CSI-2,LP} + L_{CSI-2,LP}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left[\alpha_1 \cdot \left(\sum_{l=0}^{N_{symb,all}^{PUSCH}-1} M_{sc}^{UCI}(l) - Q'_{ACK,HP} - Q'_{CSI-1,HP} - Q'_{CSI-2,HP} - Q'_{ACK/CG-UCI,LP} - Q'_{CSI-1,LP}\right)\right]\right\},$$

where in a case that there is no configured grant uplink control information CG-UCI on the target PUSCH and that a first-priority HARQ-ACK is transmitted on the target PUSCH, $Q'_{ACK/CG-UCI,LP}=Q'_{ACK,LP}$; in a case that a first-priority HARQ-ACK and CG-UCI are simultaneously transmitted on the target PUSCH, $Q'_{ACK/CG-UCI,LP}=Q'_{ACK+CG-UCI,LP}$; or in a case that CG-UCI is transmitted on the target PUSCH, but no first-priority HARQ-ACK is transmitted on the target PUSCH, $Q'_{ACK/CG-UCI,LP}=Q'_{CG-UCI}$;

where $Q'_{ACK,LP}$ is the number of coded modulation symbols per layer when the first-priority HARQ-ACK is multiplexed on the target PUSCH, $Q'_{ACK+CG-UCI,LP}$ is the number of coded modulation symbols per layer when the first-priority HARQ-ACK and the CG-UCI are multiplexed on the target PUSCH, $Q'_{CG-UCI}$ is the number of coded modulation symbols per layer when the CG-UCI is transmitted on the target PUSCH, $\alpha_1$ is the first control factor, $M_{sc}^{UCI}(l)$ is the number of resource elements REs available for transmitting UCI in an OFDM symbol l transmitted on the PUS target PUSCH, l=0, 1, $N_{symb,all}^{PUSCH}-1$, $N_{symb,all}^{PUSCH}$ is the total number of OFDM symbols of the target PUSCH inclusive of an OFDM symbol used for transmitting a DMRS, in a case that DCI scheduling the target PUSCH instructs a terminal not to transmit an r-th transport block, $K_r=0$, or else, $K_r$ is a size of an r-th transport block of the uplink service information on the target PUSCH, $C_{UL-SCH}$ is the number of transport blocks of the uplink service information on the target PUSCH, $O_{CSI-1,LP}$ is the number of bits of the CSI-part1, $L_{CSI-1,LP}$ is the number of CRC bits corresponding to the CSI-part1, $\beta_{offset}^{PUSCH}$ is a parameter for calculating the number of coded modulation symbols used when the first-priority CSI is transmitted on the first-priority PUSCH, $O_{CSI-2,LP}$ is the number of bits of the CSI-part2, $L_{CSI-2,LP}$ is the number of CRC bits corresponding to the CSI-part2, $Q'_{ACK,HP}$ is the number of coded modulation symbols per layer when a second-priority HARQ-ACK is multiplexed on the target PUSCH, $Q'_{CSI-1,HP}$ is the number of coded modulation symbols per layer when a second-priority CSI-part1 is multiplexed on the target PUSCH, and $Q'_{CSI-2,HP}$ is the number of coded modulation symbols per layer when a second-priority CSI-part2 is multiplexed on the target PUSCH.

In a possible implementation, the separately determining, by the second determining module 303 according to a target control factor, the number of coded modulation symbols per layer in a case that the first target UCI and the second target UCI are multiplexed on the target PUSCH includes:

in a case that there is uplink service information on the target PUSCH and that a priority of the target PUSCH is the second priority, determining, according to the following formula, for a second-priority target HARQ-ACK included in the second target UCI, the number $Q'_{ACK,HP}$ of coded modulation symbols per layer when the target HARQ-ACK is multiplexed on the target PUSCH:

$$Q'_{ACK,HP} = \min\left\{\left[\frac{O_{ACK,HP} + L_{ACK,HP}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r}\right],\left[\alpha_3 \cdot \sum_{l=l_0}^{N_{symb,all}^{PUSCH}-1} M_{sc}^{UCI}(l)\right]\right\},$$

where $\alpha_3$ is the third control factor, $O_{ACK,HP}$ is the number of bits of the target HARQ-ACK, $L_{ACK,HP}$ is the number of CRC bits corresponding to the target HARQ-ACK, $\beta_{offset}^{PUSCH}$ is a parameter for calculating the number of coded modulation symbols used when the second-priority HARQ-ACK is transmitted on the second-priority PUSCH, $M_{sc}^{UCI}(l)$ is the number of resource elements REs available for transmitting UCI in an OFDM symbol l transmitted on the target PUSCH, l=0, 1, 2, . . . , $N_{symb,all}^{PUSCH}-1$, $N_{symb,all}^{PUSCH}$ is the total number of OFDM symbols of the target PUSCH inclusive of an OFDM symbol used for transmitting a DMRS, in a case that DCI scheduling the target PUSCH instructs a terminal not to transmit an r-th transport block, $K_r=0$, or else, $K_r$ is a size of an r-th transport block of the uplink service information on the target PUSCH, and $C_{UL-SCH}$ is the number of transport blocks of the uplink service information on the target PUSCH.

In a possible implementation, the separately determining, by the second determining module 303 according to a target control factor, the number of coded modulation symbols per layer in a case that the first target UCI and the second target UCI are multiplexed on the target PUSCH includes:

in a case that there is uplink service information on the target PUSCH and that a priority of the target PUSCH is the second priority, determining, according to the following formulas, for second-priority target CSI included in the second target UCI, the number $Q'_{CSI-1,LP}$ of coded modulation symbols per layer when a CSI-part1 in the target CSI is multiplexed on the target PUSCH, and the number $Q'_{CSI-2,HP}$ of coded modulation symbols per layer when a CSI-part2 in the target CSI is multiplexed on the target PUSCH:

$Q'_{CSI-1,HP}$ is:

$$Q'_{CSI-1,HP} = \min\left\{\left[\frac{O_{CSI-1,HP} + L_{CSI-1,HP}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r}\right],\left[\alpha_3 \cdot \sum_{l=0}^{N_{symb,all}^{PUSCH}-1} M_{sc}^{UCI}(l)\right] - Q'_{ACK/CG-UCI,HP}\right\};$$

and $Q'_{CSI-2,HP}$ is:

$$Q'_{CSI-2,HP} = \min\left\{\left[\frac{O_{CSI-2,HP} + L_{CSI-2,HP}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r}\right],\left[\alpha_3 \cdot \sum_{l=0}^{N_{symb,all}^{PUSCH}-1} M_{sc}^{UCI}(l)\right] - Q'_{ACK/CG-UCI,HP} - Q'_{CSI-1,HP}\right\},$$

where in a case that there is no CG-UCI on the target PUSCH and that a second-priority HARQ-ACK is transmitted on the target PUSCH, $Q'_{ACK/CG-UCI,HP}=Q'_{ACK,HP}$ in a case that a second-priority HARQ-ACK and CG-UCI are simultaneously transmitted on the target PUSCH, $Q'_{ACK/CG-UCI,HP}=Q'_{ACK+CG-UCI,HP}$; or in a case that CG-UCI is transmitted on the target PUSCH, but no second-priority HARQ-ACK is transmitted on the target PUSCH, $Q'_{ACK/CG-UCI,HP}=Q'_{ACK+CG-UCI}$;

where $Q'_{ACK,HP}$ is the number of coded modulation symbols per layer when the second-priority HARQ-ACK is multiplexed on the target PUSCH $Q'_{ACK+CG-UCI,HP}$ is the number of coded modulation symbols per layer when the second-priority HARQ-ACK and the CG-UCI are multiplexed on the target PUSCH, $Q'_{CG-UCI}$ is the number of coded modulation symbols per layer when the CG-UCI is transmitted on the target PUSCH, $\alpha_3$ is the third control factor, $M_{sc}^{UCI}(l)$ is the number of resource elements REs available for transmitting UCI in an OFDM symbol l transmitted on the target PUSCH, l=0, 1, 2, . . . , $N_{symb,all}^{PUSCH}-1$, $N_{symb,all}^{PUSCH}$ is the total number of OFDM symbols of the target PUSCH inclusive of an OFDM symbol used for transmitting a DMRS, in a case that DCI scheduling the target PUSCH instructs a terminal not to transmit an r-th transport block, $K_r=0$, or else, $K_r$ is a size of an r-th transport block of the uplink service information on the target PUSCH, $C_{UL-SCH}$ is the number of transport blocks of the uplink service information on the target PUSCH, $O_{CSI-1,HP}$ is the number of bits of the CSI-part1, $L_{CSI-1,HP}$ is the number of CRC bits corresponding to the CSI-part1, $\beta_{offest}^{PUSCH}$ is a parameter for calculating the number of coded modulation symbols used when the second-priority HARQ-ACK is transmitted on the second-priority PUSCH, $O_{CSI-2,HP}$ is the number of bits of the CSI-part2, and $L_{CSI-2,HP}$ is the number of CRC bits corresponding to the CSI-part2.

In a possible implementation, the separately determining, by the second determining module 303 according to a target control factor, the number of coded modulation symbols per layer in a case that the first target UCI and the second target UCI are multiplexed on the target PUSCH includes:

in a case that there is uplink service information on the target PUSCH and that a priority of the target PUSCH is the second priority, determining, according to the following formula, for a first-priority target HARQ-ACK in the first target UCI, the number $Q'_{ACK,LP}$ of coded modulation symbols per layer when the target HARQ-ACK is multiplexed on the target PUSCH:

$$Q'_{ACK,LP} = \min\left\{\left\lceil\frac{(O_{ACK,LP} + L_{ACK,LP}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r}\right\rceil,\right.$$

$$\left.\max\left\{\left\lceil\alpha_4 \cdot \sum_{l=l_0}^{N_{symb,all}^{PUSCH}-1} M_{sc}^{UCI}(l)\right\rceil - Q'_{ACK,HP} - Q'_{CSI-1,HP} - Q'_{CSI-2,HP}, 0\right\}\right\},$$

or $$Q'_{ACK,LP} = \min\left\{\left\lceil\frac{(O_{ACK,LP} + L_{ACK,LP}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r}\right\rceil,\right.$$

$$\left.\left[\alpha_4 \cdot \sum_{l=l_0}^{N_{symb,all}^{PUSCH}-1} M_{sc}^{UCI}(l) - Q'_{ACK,HP} - Q'_{CSI-1,HP} - Q'_{CSI-2,HP}\right]\right\},$$

where $\alpha_4$ is the fourth control factor, $O_{ACK,LP}$ is the number of bits of the target HARQ-ACK, $L_{ACK,LP}$ is the number of CRC bits corresponding to the target HARQ-ACK, $\beta_{offest}^{PUSCH}$ is a parameter for calculating the number of coded modulation symbols used when the first-priority HARQ-ACK is transmitted on the second-priority PUSCH, $M_{sc}^{UCI}(l)$ is the number of resource elements REs available for transmitting UCI in an OFDM symbol l transmitted on the target PUSCH, l=0, 1, 2, . . . , $N_{symb,all}^{PUSCH}-1$, $N_{symb,all}^{PUSCH}$ the total number of OFDM symbols of the target PUSCH inclusive of an OFDM symbol used for transmitting a DMRS, in a case that DCI scheduling the target PUSCH instructs a terminal not to transmit an r-th transport block, $K_r=0$, or else, $K_r$ is a size of an r-th transport block of the uplink service information on the target PUSCH, $C_{UL-SCH}$ is the number of transport blocks of the uplink service information on the target PUSCH, $Q'_{ACK,HP}$ is the number of coded modulation symbols per layer when a second-priority HARQ-ACK is multiplexed on the target PUSCH, $Q'_{CSI-1,HP}$ is the number of coded modulation symbols per layer when a second-priority CSI-part1 is multiplexed on the target PUSCH, and $Q'_{CSI-2,HP}$ is the number of coded modulation symbols per layer when a second-priority CSI-part2 is multiplexed on the target PUSCH.

In a possible implementation, the separately determining, by the second determining module 303 according to a target control factor, the number of coded modulation symbols per layer in a case that the first target UCI and the second target UCI are multiplexed on the target PUSCH includes:

in a case that there is uplink service information on the target PUSCH and that a priority of the target PUSCH is the second priority, determining, according to the following formulas, for first-priority target CSI in the first target UCI, the number $Q'_{CSI-1,LP}$ of coded modulation symbols per layer when a CSI-part1 in the target CSI is multiplexed on the target PUSCH, and the number $Q'_{CSI-2,LP}$ of coded modulation symbols per layer when a CSI-part2 in the target CSI is multiplexed on the target PUSCH:

$Q'_{CSI-1,LP}$ is:

$$Q'_{CSI-1,LP} = \min\left\{\left\lceil\frac{(O_{CSI-1,LP} + L_{CSI-1,LP}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r}\right\rceil, \max\left\{\left\lceil\alpha_4 \cdot \right.\right.\right.$$

$$\sum_{l=0}^{N_{symb,all}^{PUSCH}-1} M_{sc}^{UCI}(l)\right\rceil - Q'_{ACK,HP} -$$

$$\left.\left.Q'_{CSI-1,HP} - Q'_{CSI-2,HP} - Q'_{ACK/CG-UCI,LP}, 0\right\}\right\}$$

or $$Q'_{CSI-1,LP} =$$

$$\min\left\{\left\lceil\frac{(O_{CSI-1,LP} + L_{CSI-1,LP}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r}\right\rceil, \left[\alpha_4 \cdot\right.\right.$$

$$\left(\sum_{l=0}^{N_{symb,all}^{PUSCH}-1} M_{sc}^{UCI}(l) - Q'_{ACK,HP} -\right.$$

$$\left.\left.\left.Q'_{CSI-1,HP} - Q'_{CSI-2,HP} - Q'_{ACK/CG-UCI,LP}\right)\right]\right\};$$

and
$Q'_{CSI-2,LP}$ is:

$$Q'_{CSI-2,LP} =$$

$$\min\left\{\left\lceil\frac{(O_{CSI-2,LP} + L_{CSI-2,LP}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r}\right\rceil, \max\left\{\left\lceil\alpha_4 \cdot\right.\right.\right.$$

-continued $$\sum_{l=0}^{N_{symb,all}^{PUSCH}-1} M_{sc}^{UCI}(l) \bigg] - Q'_{ACK,HP} -$$

$$Q'_{CSI-1,HP} - Q'_{CSI-2,HP} - Q'_{ACK/CG-UCI,LP} - Q'_{CSI-1,LP}, 0 \bigg\} \bigg\}$$

or $$Q'_{CSI-2,LP} =$$

$$\min\bigg\{ \bigg\lceil \frac{(O_{CSI-2,LP} + L_{CSI-2,LP}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \bigg\rceil, \bigg\lceil \alpha_4 \cdot$$

$$\bigg( \sum_{l=0}^{N_{symb,all}^{PUSCH}-1} M_{sc}^{UCI}(l) - Q'_{ACK,HP} -$$

$$Q'_{CSI-1,HP} - Q'_{CSI-2,HP} - Q'_{ACK/CG-UCI,LP} - Q'_{CSI-1,LP} \bigg) \bigg\rceil \bigg\},$$

where in a case that there is no CG-UCI on the target PUSCH and that a first-priority HARQ-ACK is transmitted on the target PUSCH, $Q'_{CSI-1,LP}$ and $Q'_{ACK,LP}$ in a case that a first-priority HARQ-ACK and CG-UCI are simultaneously transmitted on the target PUSCH, $Q'_{ACK/CG-UCI,LP} = Q'_{ACK+CG-UCI,LP}$; or in a case that CG-UCI is transmitted on the target PUSCH, but no first-priority HARQ-ACK is transmitted on the target PUSCH, $Q'_{CSI-1,LP}$ and $Q'_{CG-UCI}$;

where $Q'_{ACK,LP}$ is the number of coded modulation symbols per layer when the first-priority HARQ-ACK is multiplexed on the target PUSCH, $Q'_{ACK+CG-UCI,LP}$ is the number of coded modulation symbols per layer when the first-priority HARQ-ACK and the CG-UCI are multiplexed on the target PUSCH, $Q'_{CG-UCI}$ is the number of coded modulation symbols per layer when the CG-UCI is transmitted on the target PUSCH, $\alpha_4$ is the fourth control factor, $M_{sc}^{UCI}(l)$ is the number of resource elements REs available for transmitting UCI in an OFDM symbol l transmitted on the target PUSCH, l=0, 1, 2, . . . , $N_{symb,all}^{PUSCH}-1$, $N_{symb,all}^{PUSCH}$ is the total number of OFDM symbols of the target PUSCH inclusive of an OFDM symbol used for transmitting a DMRS, in a case that DCI scheduling the target PUSCH instructs a terminal not to transmit an r-th transport block, $K_r=0$, or else, $K_r$ is a size of an r-th transport block of the uplink service information on the target PUSCH, $C_{UL-SCH}$ is the number of transport blocks of the uplink service information on the target PUSCH, $O_{CSI-1,LP}$ is the number of bits of the CSI-part1, $L_{CSI-1,LP}$ is the number of CRC bits corresponding to the CSI-part1, $\beta_{offest}^{PUSCH}$ is a parameter for calculating the number of coded modulation symbols used when the first-priority CSI is transmitted on the second-priority PUSCH, $O_{CSI-2,LP}$ is the number of bits of the CSI-part2, $L_{CSI-2,LP}$ is the number of CRC bits corresponding to the CSI-part2, $Q'_{ACK,HP}$ is the number of coded modulation symbols per layer when a second-priority HARQ-ACK is multiplexed on the target PUSCH, $Q'_{CSI-1,HP}$ is the number of coded modulation symbols per layer when a second-priority CSI-part1 is multiplexed on the target PUSCH, and $Q'_{CSI-2,HP}$ is the number of coded modulation symbols per layer when a second-priority CSI-part2 is multiplexed on the target PUSCH.

In a possible implementation, in a case that only one of the first-priority CSI and second-priority CSI is capable of being multiplexed on the target PUSCH, values of $Q'_{CSI-1,LP}$ and $Q'_{CSI-2,LP}$ are 0.

In a possible implementation, the separately determining, by the second determining module 303 according to a target control factor, the number of coded modulation symbols per layer in a case that the first target UCI and the second target UCI are multiplexed on the target PUSCH includes:

in a case that there is no uplink service information on the target PUSCH and that a priority of the target PUSCH is the first priority, determining, according to the following formula, for a second-priority target HARQ-ACK in the second target UCI, the number $Q'_{ACK,HP}$ of coded modulation symbols per layer when the target HARQ-ACK is multiplexed on the target PUSCH:

$$Q'_{ACK,HP} =$$

$$\min\bigg\{ \bigg\lceil \frac{(O_{ACK,HP} + L_{ACK,HP}) \cdot \beta_{offset}^{PUSCH}}{R \cdot Q_m} \bigg\rceil, \bigg\lceil \alpha_2 \cdot \sum_{l=l_0}^{N_{symb,all}^{PUSCH}-1} M_{sc}^{UCI}(l) \bigg\rceil \bigg\},$$

where $\alpha_2$ is the second control factor, $O_{ACK,HP}$ is the number of bits of the target HARQ-ACK, $L_{ACK,HP}$ is the number of CRC bits corresponding to the target HARQ-ACK, is a parameter for calculating the number of coded modulation symbols used when the second-priority HARQ-ACK is transmitted on the first-priority PUSCH, $M_{sc}^{UCI}(l)$ is the number of resource elements REs available for transmitting UCI in an OFDM symbol l transmitted on the target PUSCH, l=0, 1, 2, . . . , $N_{symb,all}^{PUSCH}-1$, $N_{symb,all}^{PUSCH}$ the total number of OFDM symbols of the target PUSCH inclusive of an OFDM symbol used for transmitting a DMRS, R is a bit rate of the target PUSCH, and $Q_m$ is a modulation and coding order of the target PUSCH.

In a possible implementation, the separately determining, by the second determining module 303 according to a target control factor, the number of coded modulation symbols per layer in a case that the first target UCI and the second target UCI are multiplexed on the target PUSCH includes:

in a case that there is no uplink service information on the target PUSCH and that a priority of the target PUSCH is the first priority, determining, according to the following formula, for a first-priority HARQ-ACK in the first target UCI, the number $Q'_{ACK,LP}$ of coded modulation symbols per layer when the target HARQ-ACK is multiplexed on the target PUSCH:

$$Q'_{ACK,LP} = \min\bigg\{ \bigg\lceil \frac{(O_{ACK,LP} + L_{ACK,LP}) \cdot \beta_{offset}^{PUSCH}}{R \cdot Q_m} \bigg\rceil,$$

$$\max\bigg\{ \bigg\lceil \alpha_1 \cdot \sum_{l=l_0}^{N_{symb,all}^{PUSCH}-1} M_{sc}^{UCI}(l) \bigg\rceil - Q'_{ACK,HP}, 0 \bigg\} \bigg\} \text{ or }$$

$$Q'_{ACK,LP} = \min\bigg\{ \bigg\lceil \frac{(O_{ACK,LP} + L_{ACK,LP}) \cdot \beta_{offset}^{PUSCH}}{R \cdot Q_m} \bigg\rceil,$$

$$\bigg\lceil \alpha_1 \cdot \bigg( \sum_{l=l_0}^{N_{symb,all}^{PUSCH}-1} M_{sc}^{UCI}(l) - Q'_{ACK,HP} \bigg) \bigg\rceil \bigg\},$$

where $\alpha_1$ is the first control factor, $O_{ACK,LP}$ is the number of bits of the target HARQ-ACK, $L_{ACK,LP}$ is the number of CRC bits corresponding to the target HARQ-ACK, $\beta_{offest}^{PUSCH}$ is a parameter for calculating the number of coded modulation symbols used when the first-priority HARQ-ACK is transmitted on the first-priority PUSCH, $M_{sc}^{UCI}(l)$ is the number of resource elements REs available for transmitting UCI in an OFDM symbol l transmitted on the target PUSCH, l=0, 1, 2, ..., $N_{symb,all}^{PUSCH}-1$, $N_{symb,all}^{PUSCH}$ is the total number of OFDM symbols of the target PUSCH inclusive of an OFDM symbol used for transmitting a DMRS, R is a bit rate of the target PUSCH, $Q_m$ is a modulation and coding order of the target PUSCH, and $Q'_{ACK,HP}$ is the number of coded modulation symbols per layer when a second-priority HARQ-ACK is multiplexed on the target PUSCH.

In a possible implementation, the separately determining, by the second determining module 303 according to a target control factor, the number of coded modulation symbols per layer in a case that the first target UCI and the second target UCI are multiplexed on the target PUSCH includes:

in a case that there is no uplink service information on the target PUSCH and that the priority of the target PUSCH is the first priority, determining, according to the following formula, for first-priority target CSI in the first target UCI, the number of coded modulation symbols per layer when the target CSI is multiplexed on the target PUSCH:

in a case that the target CSI includes a CSI-part1 and a CSI-part2, the number of coded modulation symbols per layer for the target CSI includes $Q'_{CSI-1,LP}$ and $Q'_{CSI-2,LP}$, and $$Q'_{CSI-1,LP} = \min\left\{\left\lceil \frac{(O_{CSI-1,LP} + L_{CSI-1,LP}) \cdot \hat{a}_{offset}^{PUSCH}}{R \cdot Q_m} \right\rceil, \right.$$

$$\left. \sum_{l=0}^{N_{symb,all}^{PUSCH}-1} M_{sc}^{UCI}(l) - Q'_{ACK,HP} - Q'_{ACK,LP}\right\} \text{ and}$$

$$Q'_{CSI-2,LP} = \sum_{l=0}^{N_{symb,all}^{PUSCH}-1} M_{sc}^{UCI}(l) - Q'_{ACK,HP} - Q'_{ACK,LP} - Q'_{CSI-1,LP};$$

or if the target CSI includes only a CSI-part1, the number of coded modulation symbols per layer for the target CSI includes $Q'_{CSI-1,LP}$, and $$Q'_{CSI-1,LP} = \sum_{l=0}^{N_{symb,all}^{PUSCH}-1} M_{sc}^{UCI}(l) - Q'_{ACK,HP} - Q'_{ACK,LP},$$

where $O_{CSI-1,LP}$ is the number of bits of the CSI-part1, and $L_{CSI-1,LP}$ is the number of CRC bits corresponding to the CSI-part1.

In a possible implementation, the separately determining, by the second determining module 303 according to a target control factor, the number of coded modulation symbols per layer in a case that the first target UCI and the second target UCI are multiplexed on the target PUSCH includes:

in a case that there is no uplink service information on the target PUSCH and that a priority of the target PUSCH is the second priority, determining, according to the following formula, for a second-priority target HARQ-ACK in the second target UCI, the number $Q'_{ACK,HP}$ of coded modulation symbols per layer when the target HARQ-ACK is multiplexed on the target PUSCH:

$$Q'_{ACK,HP} = \min\left\{\left\lceil \frac{(O_{ACK,HP} + L_{ACK,HP}) \cdot \beta_{offset}^{PUSCH}}{R \cdot Q_m} \right\rceil, \left\lceil \alpha_3 \cdot \sum_{l=l_0}^{N_{symb,all}^{PUSCH}-1} M_{sc}^{UCI}(l) \right\rceil\right\},$$

where $\alpha_3$ is the third control factor, $O_{ACK,HP}$ is the number of bits of the target HARQ-ACK, $L_{ACK,HP}$ is the number of CRC bits corresponding to the target HARQ-ACK, $\beta_{offest}^{PUSCH}$ is a parameter for calculating the number of coded modulation symbols used when the second-priority HARQ-ACK is transmitted on the second-priority PUSCH, $M_{sc}^{UCI}(l)$ is the number of resource elements REs available for transmitting UCI in an OFDM symbol l transmitted on the target PUSCH, l=0, 1, 2, ..., $N_{symb,all}^{PUSCH}-1$, $N_{symb,all}^{PUSCH}$ is the total number of OFDM symbols of the target PUSCH inclusive of an OFDM symbol used for transmitting a DMRS, R is a bit rate of the target PUSCH, and $Q_m$ is a modulation and coding order of the target PUSCH.

In a possible implementation, the separately determining, by the second determining module 303 according to a target control factor, the number of coded modulation symbols per layer in a case that the first target UCI and the second target UCI are multiplexed on the target PUSCH includes:

in a case that there is no uplink service information on the target PUSCH and that the priority of the target PUSCH is the second priority, determining, according to the following formula, for a first-priority target HARQ-ACK in the first target UCI, the number $Q'_{ACK,LP}$ of coded modulation symbols per layer when the first-priority target HARQ-ACK is multiplexed on the target PUSCH:

$$Q'_{ACK,LP} = \min\left\{\left\lceil \frac{(O_{ACK,LP} + L_{ACK,LP}) \cdot \beta_{offset}^{PUSCH}}{R \cdot Q_m} \right\rceil, \right.$$

$$\left. \max\left\{\left\lceil \alpha_4 \cdot \sum_{l=l_0}^{N_{symb,all}^{PUSCH}-1} M_{sc}^{UCI}(l) \right\rceil - Q'_{ACK,HP}, 0\right\}\right\} \text{ or}$$

$$Q'_{ACK,LP} = \min\left\{\left\lceil \frac{(O_{ACK,LP} + L_{ACK,LP}) \cdot \beta_{offset}^{PUSCH}}{R \cdot Q_m} \right\rceil, \right.$$

$$\left. \left\lceil \alpha_4 \cdot \left(\sum_{l=l_0}^{N_{symb,all}^{PUSCH}-1} M_{sc}^{UCI}(l) - Q'_{ACK,HP}\right) \right\rceil\right\},$$

where $\alpha_4$ is the fourth control factor, $O_{ACK,LP}$ is the number of bits of the first-priority target HARQ-ACK, and $L_{ACK,LP}$ is the number of CRC bits corresponding to the first-priority target HARQ-ACK.

In a possible implementation, the separately determining, by the second determining module 303 according to a target control factor, the number of coded modulation symbols per layer in a case that the first target UCI and the second target UCI are multiplexed on the target PUSCH includes:

in a case that there is no uplink service information on the target PUSCH and that the priority of the target PUSCH is the second priority, determining, according to the following formula, for second-priority target CSI in the second target UCI, the number of coded modulation symbols per layer when the target CSI is multiplexed on the target PUSCH:

in a case that the target CSI includes a CSI-part1 and a CSI-part2, the number of coded modulation symbols per layer for the target CSI includes $Q'_{CSI-1,HP}$ and $Q_{CSI-2,HP}$, and $$Q'_{CSI-1,HP} = \min\left\{\left\lceil\frac{(O_{CSI-1,LP} + L_{CSI-1,LP}) \cdot \beta_{offset}^{PUSCH}}{R \cdot Q_m}\right\rceil,\right.$$

$$\left.\sum_{l=0}^{N_{symb,all}^{PUSCH}-1} M_{sc}^{UCI}(l) - Q'_{ACK,HP} - Q'_{ACK,LP}\right\} \text{ and}$$

$$Q'_{CSI-2,HP} = \sum_{l=0}^{N_{symb,all}^{PUSCH}-1} M_{sc}^{UCI}(l) - Q'_{ACK,HP} - Q'_{ACK,LP} - Q'_{CSI-1,HP};$$

or if the target CSI includes only a CSI-part1, the number of coded modulation symbols per layer for the target CSI includes $Q'_{CSI-1,HP}$, and $$Q'_{CSI-1,HP} = \sum_{l=0}^{N_{symb,all}^{PUSCH}-1} M_{sc}^{UCI}(l) - Q'_{ACK,HP} - Q'_{ACK,LP},$$

where $O_{CSI-1,LP}$ is the number of bits of the CSI-part1, and $L_{CSI-1,LP}$ is the number of CRC bits corresponding to the CSI-part1.

In a possible implementation, the separately determining, by the second determining module 303 according to a target control factor, the number of coded modulation symbols per layer in a case that the first target UCI and the second target UCI are multiplexed on the target PUSCH includes:

in a case that there is no uplink service information on the target PUSCH and that the priority of the target PUSCH is the second priority, determining, according to the following formula, for second-priority target CSI in the second target UCI, the number of coded modulation symbols per layer when the target CSI is multiplexed on the target PUSCH:

in a case that the target CSI includes a CSI-part1 and a CSI-part2, the number of coded modulation symbols per layer for the target CSI includes $Q'_{CSI-1,HP}$ and $Q'_{CSI-2,HP}$, and $$Q'_{CSI-1,HP} = \min\left\{\left\lceil\frac{(O_{CSI-1,HP} + L_{CSI-1,HP}) \cdot \beta_{offset}^{PUSCH}}{R \cdot Q_m}\right\rceil,\right.$$

$$\left.\sum_{l=0}^{N_{symb,all}^{PUSCH}-1} M_{sc}^{UCI}(l) - Q'_{ACK,HP}\right\} \text{ and}$$

$$Q'_{CSI-2,HP} = \min\left\{\left\lceil\frac{(O_{CSI-2,HP} + L_{CSI-2,HP}) \cdot \beta_{offset}^{PUSCH}}{R \cdot Q_m}\right\rceil,\right.$$

$$\left.\sum_{l=0}^{N_{symb,all}^{PUSCH}-1} M_{sc}^{UCI}(l) - Q'_{ACK,HP} - Q'_{CSI-1,HP}\right\};$$

or if the target CSI includes only a CSI-part1, the number of coded modulation symbols per layer for the target CSI includes $Q'_{CSI-1,HP}$, and $$Q'_{CSI-1,HP} = \sum_{l=0}^{N_{symb,all}^{PUSCH}-1} M_{sc}^{UCI}(l) - Q'_{ACK,HP},$$

where $O_{CSI-1,HP}$ is the number of bits of the CSI-part1, $L_{CSI-1,HP}$ is the number of CRC bits corresponding to the CSI-part1, $\beta_{offset}^{PUSCH}$ is a parameter for calculating the number of coded modulation symbols used when the second-priority CSI is transmitted on the second-priority PUSCH, $O_{CSI-2,HP}$ is the number of bits of the CSI-part2, and $L_{CSI-2,HP}$ is the number of CRC bits corresponding to the CSI-part2.

In a possible implementation, the separately determining, by the second determining module 303 according to a target control factor, the number of coded modulation symbols per layer in a case that the first target UCI and the second target UCI are multiplexed on the target PUSCH includes:

in a case that there is no uplink service information on the target PUSCH and that the priority of the target PUSCH is the second priority, determining, according to the following formula, for a first-priority target HARQ-ACK in the first target UCI, the number ACK $Q'_{ACK,LP}$ of coded modulation symbols per layer when the first-priority target HARQ-ACK is multiplexed on the target PUSCH:

$$Q'_{ACK,LP} = \min\left\{\left\lceil\frac{(O_{ACK,LP} + L_{ACK,LP}) \cdot \beta_{offset}^{PUSCH}}{R \cdot Q_m}\right\rceil,\right.$$

$$\left.\max\left\{\left\lceil\alpha_4 \cdot \sum_{l=l_0}^{N_{symb,all}^{PUSCH}-1} M_{sc}^{UCI}(l)\right\rceil - Q'_{ACK,HP} - Q'_{CSI-1,HP} - Q'_{CIS-2,HP}, 0\right\}\right\}$$

or $$Q'_{ACK,LP} = \sum_{l=l_0}^{N_{symb,all}^{PUSCH}-1} M_{sc}^{UCI}(l) - Q'_{ACK,HP} - Q'_{CSI-1,HP} - Q'_{CSI-2,HP},$$

where $\alpha_4$ is the fourth control factor, $O_{ACK,LP}$ is the number of bits of the target HARQ-ACK, and $L_{ACK,LP}$ is the number of CRC bits corresponding to the target HARQ-ACK.

In a possible implementation, the obtaining, by the obtaining module 301, at least one control factor includes:

configuring the at least one control factor for a terminal; or obtaining the at least one control factor configured by a network-side device.

In a possible implementation, the configuring the at least one control factor for a terminal includes one of the following: configuring the at least one control factor multiple times, one or more of the at least one control factor per time; and configuring the at least one control factor once.

The apparatus for determining the number of coded modulation symbols in this embodiment of this application may be an apparatus, or may be a component, an integrated circuit, or a chip in a communications device. The communications device may be a mobile terminal, or may be a nonmobile terminal, or may be a network-side device. For example, the mobile terminal may include but is not limited to the foregoing illustrated type of the terminal 11. The nonmobile terminal may be a server, a network attached storage (NAS), a personal computer (PC), a television (TV), a teller machine, a self-service machine, or the like. This is not specifically limited in this embodiment of this application.

The apparatus for determining the number of coded modulation symbols in this embodiment of this application may be an apparatus having an operating system. The operating system may be an Android operating system, an iOS operating system, or other possible operating systems, and is not specifically limited in this embodiment of this application.

The apparatus for determining the number of coded modulation symbols provided in this embodiment of this application can implement each process implemented by the method embodiment in FIG. 2, with the same technical effect achieved. To avoid repetition, details are not described herein again.

Figure 4:
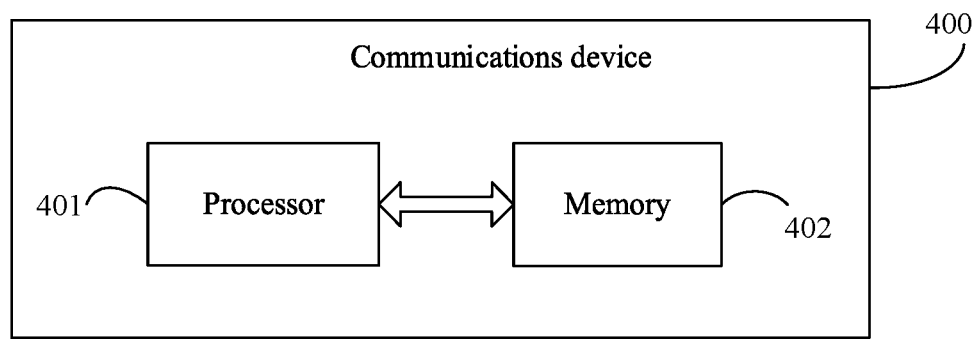
FIG. 4 is a schematic diagram of a structure of a communications device according to an embodiment of this application.

Optionally, as shown in FIG. 4, an embodiment of this application further provides a communications device 400, including a processor 401, a memory 402, and a program or instructions stored in the memory 402 and capable of running on the processor 401. For example, when the communications device 400 is a terminal, when the program or instructions are executed by the processor 401, each process of the foregoing embodiment of the method for determining the number of coded modulation symbols is implemented, with the same technical effect achieved. When the communications device 400 is a network-side device, and the program or instructions are executed by the processor 401, each process of the foregoing embodiment of the method for determining the number of coded modulation symbols is implemented, with the same technical effect achieved. To avoid repetition, details are not described herein again.

Figure 5:
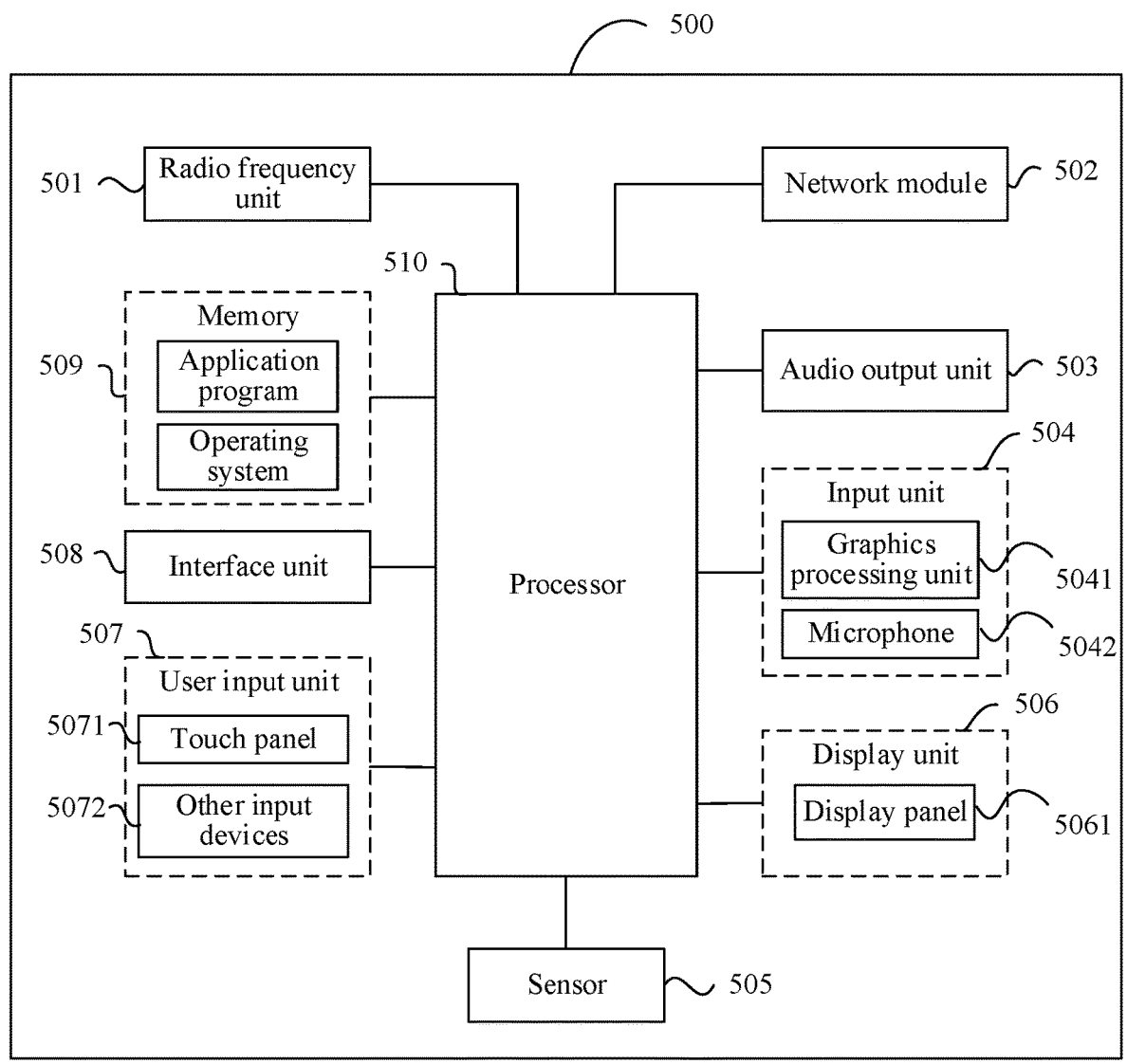
FIG. 5 is a schematic diagram of a hardware structure of a terminal according to an embodiment of this application.

FIG. 5 is a schematic diagram of a hardware structure of a terminal for implementing an embodiment of this application.

The terminal 500 includes but is not limited to components such as a radio frequency unit 501, a network module 502, an audio output unit 503, an input unit 504, a sensor 505, a display unit 506, a user input unit 507, an interface unit 508, a memory 509, and a processor 510.

Persons skilled in the art may understand that the terminal 500 may further include a power supply (for example, a battery) supplying power to all components. The power supply may be logically connected to the processor 510 through a power management system. In this way, functions such as charge management, discharge management, and power consumption management are implemented by using the power management system. The terminal structure shown in FIG. 5 does not constitute a limitation on the terminal. The terminal may include more or fewer components than those shown in the figure, or some components are combined, or component arrangements are different. Details are not described herein again.

It should be understood that, in this embodiment of this application, the input unit 504 may include a graphics processing unit (GPU) 5041 and a microphone 5042. The graphics processing unit 5041 processes image data of a still picture or video obtained by an image capture apparatus (such as a camera) in a video capture mode or an image capture mode. The display unit 506 may include a display panel 5061, and the display panel 5061 may be configured in a form of a liquid crystal display, an organic light-emitting diode, or the like. The user input unit 507 includes a touch panel 5071 and other input devices 5072. The touch panel 5071 is also referred to as a touchscreen. The touch panel 5071 may include two parts: a touch detection apparatus and a touch controller. The other input devices 5072 may include but are not limited to a physical keyboard, a function key (such as a volume control key or a switch key), a trackball, a mouse, and a joystick. Details are not described herein again.

In this embodiment of this application, after receiving downlink data from a network-side device, the radio frequency unit 501 sends the downlink data to the processor 510 for processing, and in addition, sends uplink data to the network-side device. Generally, the radio frequency unit 501 includes but is not limited to an antenna, at least one amplifier, a transceiver, a coupler, a low noise amplifier, a duplexer, and the like.

The memory 509 may be configured to store software programs or instructions and various data. The memory 509 may primarily include a program or instruction storage area and a data storage area. The program or instruction storage area may store an operating system, an application program or instructions (such as an audio play function and an image play function) required by at least one function, and the like. In addition, the memory 509 may include a high-speed random access memory, and may further include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, a flash memory device, or another non-volatile solid-state storage device.

The processor 510 may include one or more processing units. Optionally, the processor 510 may integrate an application processor and a modem processor. The application processor mainly processes the operating system, a user interface, an application program, or an instruction. The modem processor mainly processes wireless communication. For example, the modem processor is a baseband processor. It may be understood that the modem processor may alternatively not be integrated in the processor 510.

The processor 510 is configured to:
obtain at least one control factor, where the control factor is used to limit a resource occupied when uplink control information UCI is multiplexed on a physical uplink shared channel PUSCH;
determine first target UCI and second target UCI multiplexed on a target PUSCH for transmission, where a priority of the first target UCI is a first priority, a priority of the second target UCI is a second priority, and the first priority is lower than the second priority; and
separately determine, according to a target control factor, the number of coded modulation symbols per layer in a case that the first target UCI and the second target UCI are multiplexed on the target PUSCH, where the target control factor is one or more of the at least one control factor.

Figure 6:
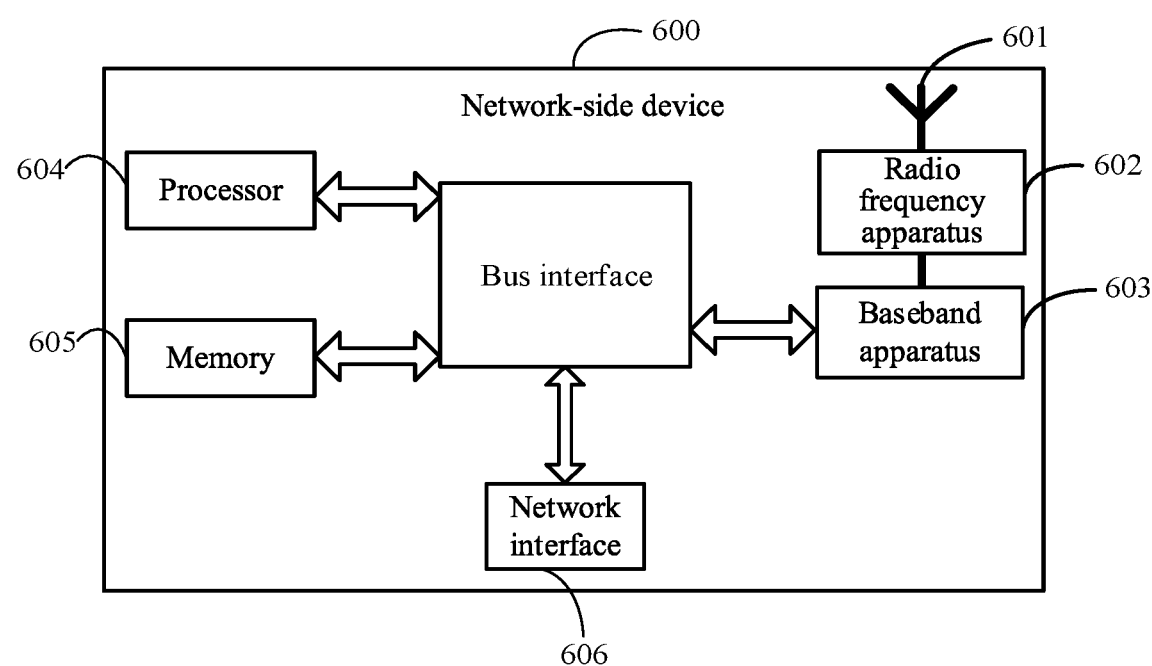
FIG. 6 is a schematic diagram of a hardware structure of a network-side device according to an embodiment of this application.

Specifically, an embodiment of this application further provides a network-side device. As shown in FIG. 6, the network-side device 600 includes an antenna 601, a radio frequency apparatus 602, and a baseband apparatus 603. The antenna 601 is connected to the radio frequency apparatus 602. In an uplink direction, the radio frequency apparatus 602 receives information by using the antenna 601, and sends the received information to the baseband apparatus 603 for processing. In a downlink direction, the baseband apparatus 603 processes to-be-sent information, and sends the information to the radio frequency apparatus 602; and the radio frequency apparatus 602 processes the received information and then sends the information out by using the antenna 601.

A frequency band processing apparatus may be located in the baseband apparatus 603. The method performed by the network-side device in the foregoing embodiment may be implemented in the baseband apparatus 603, and the baseband apparatus 603 includes a processor 604 and a memory 605.

The baseband apparatus 603 may include, for example, at least one baseband unit, where multiple chips are disposed on the baseband unit. As shown in FIG. 6, one of the chips is, for example, the processor 604, connected to the memory 605, to invoke a program in the memory 605 to perform the operation of the network device shown in the foregoing method embodiment.

The baseband apparatus 603 may further include a network interface 606, configured to exchange information with the radio frequency apparatus 602, where the interface is, for example, a common public radio interface (CPRI for short).

Specifically, the network-side device in this embodiment of the present invention further includes a program or instructions stored in the memory 605 and capable of running on the processor 604. When the processor 604 invokes the program or instructions in the memory 605, the method performed by each module shown in FIG. 3 is performed, with the same technical effect achieved. To avoid repetition, details are not described herein again.

An embodiment of this application further provides a readable storage medium. The readable storage medium stores a program or instructions. When the program or instructions are executed by a processor, each process of the foregoing embodiment of the method for determining the number of coded modulation symbols is implemented, with the same technical effect achieved. To avoid repetition, details are not described herein again.

The processor is a processor in the terminal in the foregoing embodiment. The readable storage medium includes a computer-readable storage medium, for example, a computer read-only memory (ROM), a random access memory (RAM), a magnetic disk, or an optical disc.

In addition, an embodiment of this application provides a chip. The chip includes a processor and a communications interface. The communications interface is coupled to the processor. The processor is configured to run a program or instructions on a network-side device to implement each process of the foregoing embodiment of the method for determining the number of coded modulation symbols, with the same technical effect achieved. To avoid repetition, details are not described herein again.

An embodiment of this application further provides a computer program product. The computer program product includes a processor, a memory, and a program or instructions stored in the memory and capable of running on the processor. When the program or instructions are executed by the processor, each process of the foregoing embodiment of the method for determining the number of coded modulation symbols is implemented, with the same technical effect achieved. To avoid repetition, details are not described herein again.

It should be understood that the chip provided in this embodiment of this application may also be referred to as a system-level chip, a system chip, a chip system, a system-on-chip, or the like.

It should be noted that in this specification, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. In addition, it should be noted that the scope of the method and apparatus in the implementations of this application is not limited to performing the functions in an order shown or discussed, and may further include performing the functions in a substantially simultaneous manner or in a reverse order depending on the functions used. For example, the method described may be performed in an order different from that described, and various steps may be added, omitted, or combined. In addition, features described with reference to some examples may be combined in other examples.

According to the foregoing description of the implementations, persons skilled in the art may clearly understand that the methods in the foregoing embodiments may be implemented by using software in combination with a necessary general hardware platform, and certainly may alternatively be implemented by using hardware. However, in most cases, the former is a preferred implementation. Based on such an understanding, the technical solutions of this application essentially or the part contributing to the prior art may be implemented in a form of a software product. The computer software product is stored in a storage medium (such as a ROM/RAM, a magnetic disk, or an optical disc), and includes several instructions for enabling a terminal (which may be a mobile phone, a computer, a server, a network device, or the like) to perform the methods described in the embodiments of this application.

The embodiments of this application are described above with reference to the accompanying drawings. However, this application is not limited to the foregoing specific embodiments. The foregoing specific embodiments are merely illustrative rather than restrictive. Inspired by this application, persons of ordinary skill in the art can still derive a plurality of variations without departing from the essence of this application and the protection scope of the claims. All these variations shall fall within the protection scope of this application.

What is claimed is:

1. A method for determining the number of coded modulation symbols, comprising:
    obtaining, by a communications device, at least one control factor, wherein the control factor is used to limit a resource element (RE) occupied when uplink control information (UCI) is multiplexed on a physical uplink shared channel (PUSCH);
    determining first target UCI and second target UCI multiplexed on a target PUSCH for transmission, wherein a priority of the first target UCI is a first priority, a priority of the second target UCI is a second priority, and the first priority is lower than the second priority; and
    separately determining, according to a target control factor, the number of coded modulation symbols per layer when the first target UCI and the second target UCI are multiplexed on the target PUSCH, wherein the target control factor is one or more of the at least one control factor.

2. The method according to claim 1, wherein when UCI with different priorities is multiplexed on PUSCHs with different priorities, corresponding control factors are different.

3. The method according to claim 1, wherein the at least one control factor comprises at least one of the following:
    a first control factor used to control a resource occupied when first-priority UCI is multiplexed on a first-priority PUSCH;
    a second control factor used to control a resource occupied when second-priority UCI is multiplexed on a first-priority PUSCH;
    a third control factor used to control a resource occupied when second-priority UCI is multiplexed on a second-priority PUSCH; and a fourth control factor used to control a resource occupied when first-priority UCI is multiplexed on a second-priority PUSCH.

4. The method according to claim 3, wherein the separately determining, according to a target control factor, the number of coded modulation symbols per layer when the first target UCI and the second target UCI are multiplexed on the target PUSCH comprises:
separately determining, in the following order, the number of coded modulation symbols per layer when the first target UCI and the second target UCI are multiplexed on the target PUSCH:
first determining the number of coded modulation symbols per layer when high-priority UCI is multiplexed on the target PUSCH, and then determining the number of coded modulation symbols per layer when low-priority UCI is multiplexed on the target PUSCH, wherein when UCI with a same priority comprises different types of UCI, the number of coded modulation symbols per layer when hybrid automatic repeat request acknowledgement (HARQ-ACK) information is multiplexed on the target PUSCH is first determined, and then the number of coded modulation symbols per layer when channel state information (CSI) is multiplexed on the target PUSCH is determined; or
first determining the number of coded modulation symbols per layer when a HARQ-ACK is multiplexed on the target PUSCH, and then determining the number of coded modulation symbols per layer when CSI is multiplexed on the target PUSCH, wherein when a same type of UCI comprises UCI with different priorities, the number of coded modulation symbols per layer when high-priority UCI is multiplexed on the target PUSCH is first determined, and then the number of coded modulation symbols per layer when low-priority UCI is multiplexed on the target PUSCH is determined.

5. The method according to claim 1, further comprising:
separately determining, according to a target parameter, the number of coded modulation symbols per layer when the first target UCI and the second target UCI are multiplexed on the target PUSCH, wherein, for PUSCHs with different priorities and UCI with different priorities and/or of different types, the target parameter is a parameter for calculating the number of coded modulation symbols used.

6. The method according to claim 4, wherein the separately determining, according to a target control factor, the number of coded modulation symbols per layer when the first target UCI and the second target UCI are multiplexed on the target PUSCH comprises:
when there is uplink service UL-SCH information on the target PUSCH and that a priority of the target PUSCH is the first priority, determining, according to the following formula, for a second-priority target HARQ-ACK comprised in the second target UCI, the number $Q'_{ACK,HP}$ of coded modulation symbols per layer when the target HARQ-ACK is multiplexed on the target PUSCH:

$$Q'_{ACK,HP} = \min\left\{\left\lceil\frac{(O_{ACK,HP} + L_{ACK,HP}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r}\right\rceil,\right.$$

$$\left.\left\lceil\alpha_2 \cdot \sum_{l=l_0}^{N_{symb,all}^{PUSCH}-1} M_{sc}^{UCI}(l)\right\rceil\right\},$$

wherein $\alpha_2$ is the second control factor, $O_{ACK,HP}$ is the number of bits of the second-priority target HARQ-ACK, $L_{ACK,HP}$ is the number of cyclic redundancy check CRC bits corresponding to the target HARQ-ACK, $\beta_{offset}^{PUSCH}$ is a parameter for calculating the number of coded modulation symbols used when the second-priority HARQ-ACK is transmitted on the first-priority PUSCH, $M_{sc}^{UCI}(l)$ is the number of resource elements (REs) available for transmitting UCI in an orthogonal frequency division multiplexing OFDM symbol l transmitted on the target PUSCH, l=0, 1, 2, . . . , $N_{symb,all}^{PUSCH}-1$, $N_{symb,all}^{PUSCH}$ is the total number of OFDM symbols of the target PUSCH inclusive of an OFDM symbol used for transmitting a demodulation reference signal DMRS, when downlink control information (DCI) scheduling the target PUSCH instructs a terminal not to transmit an r-th transport block, $K_r=0$, or else, $K_r$ is the size of the r-th transport block of the uplink service information on the target PUSCH, and $C_{UL-SCH}$ is the number of transport blocks of the uplink service information on the target PUSCH; or when there is uplink service information on the target PUSCH and that a priority of the target PUSCH is the first priority, determining, according to the following formulas, for second-priority target CSI comprised in the second target UCI, the number $Q'_{CSI-1,HP}$ of coded modulation symbols per layer when a channel state information part 1 CSI-part1 in the target CSI is multiplexed on the target PUSCH, and the number $Q'_{CSI-2,HP}$ of coded modulation symbols per layer when a channel state information part 2 CSI-part2 in the target CSI is multiplexed on the target PUSCH:

$$Q'_{CSI-1,HP} = $$

$$\min\left\{\left\lceil\frac{(O_{CSI-1,HP} + L_{CSI-1,HP}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r}\right\rceil,\right.$$

$$\left.\left\lceil\alpha_2 \cdot \sum_{l=0}^{N_{symb,all}^{PUSCH}-1} M_{sc}^{UCI}(l)\right\rceil - Q'_{ACK,HP}\right\} \text{ and}$$

$$Q'_{CSI-2,HP} = $$

$$\min\left\{\left\lceil\frac{(O_{CSI-2,HP} + L_{CSI-2,HP}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r}\right\rceil,\right.$$

$$\left.\left\lceil\alpha_2 \cdot \sum_{l=0}^{N_{symb,all}^{PUSCH}-1} M_{sc}^{UCI}(l)\right\rceil - Q'_{ACK,HP} - Q'_{CSI-1,HP}\right\},$$

wherein $Q'_{ACK,HP}$ is the number of coded modulation symbols per layer when a second-priority HARQ-ACK is multiplexed on the target PUSCH, $\alpha_2$ is the second control factor, $M_{sc}^{UCI}(l)$ is the number of resource elements (REs) available for transmitting UCI in an OFDM symbol l transmitted on the target PUSCH, l=0, 1, 2, ..., $N_{symb,all}^{PUSCH}-1$, $N_{symb,all}^{PUSCH}$ is the total number of OFDM symbols of the target PUSCH inclusive of an OFDM symbol used for transmitting a DMRS, when DCI scheduling the target PUSCH instructs a terminal not to transmit an r-th transport block, $K_r=0$, or else, $K_r$ is a size of an r-th transport block of the uplink service information on the target PUSCH, $C_{UL-SCH}$ is the number of transport blocks of the uplink service information on the target PUSCH, $O_{CSI-1,HP}$ is the number of bits of the CSI-part1, $L_{CSI-1,HP}$ is the number of CRC bits corresponding to the CSI-part1, $\beta_{offset}^{PUSCH}$ is a parameter for calculating the number of coded modulation symbols used when the second-priority CSI is transmitted on the first-priority PUSCH, $O_{CSI-2,HP}$ is the number of bits of the CSI-part2, and $L_{CSI-2,HP}$ is the number of CRC bits corresponding to the CSI-part2; or when there is uplink service information on the target PUSCH and that a priority of the target PUSCH is the first priority, determining, according to the following formula, for a first-priority target HARQ-ACK comprised in the first target UCI, the number $Q'_{ACK,LP}$ of coded modulation symbols per layer when the target HARQ-ACK is multiplexed on the target PUSCH:

$$Q'_{ACK,LP} = \min\left\{\left[\frac{(O_{ACK,LP}+L_{ACK,LP})\cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r}\right],\right.$$

$$\left.\max\left\{\left[\alpha_1 \cdot \sum_{l=l_0}^{N_{symb,all}^{PUSCH}-1} M_{sc}^{UCI}(l)\right] - Q'_{ACK,HP} - Q'_{CSI-1,HP} - Q'_{CSI-2,HP}, 0\right\}\right\}$$

or $$Q'_{ACK,LP} = \min\left\{\left[\frac{(O_{ACK,LP}+L_{ACK,LP})\cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r}\right],\right.$$

$$\left.\left[\alpha_1 \cdot \left(\sum_{l=l_0}^{N_{symb,all}^{PUSCH}-1} M_{sc}^{UCI}(l) - Q'_{ACK,HP} - Q'_{CSI-1,HP} - Q'_{CSI-2,HP}\right)\right]\right\},$$

wherein $\alpha_1$ is the first control factor, $O_{ACK,LP}$ is the number of bits of the first-priority target HARQ-ACK, $L_{ACK,LP}$ is the number of CRC bits corresponding to the target HARQ-ACK, $\beta_{offset}^{PUSCH}$ is a parameter for calculating the number of coded modulation symbols used when the first-priority HARQ-ACK is transmitted on the first-priority PUSCH, $M_{sc}^{UCI}$ is the number of resource elements (REs) available for transmitting UCI in an OFDM symbol l transmitted on the target PUSCH, l=0, 1, 2, ..., $N_{symb,all}^{PUSCH}-1$, $N_{symb,all}^{PUSCH}$ is the total number of OFDM symbols of the target PUSCH inclusive of an OFDM symbol used for transmitting a DMRS, when DCI scheduling the target PUSCH instructs a terminal not to transmit an r-th transport block, $K_r=0$, or else, $K_r$ is a size of an r-th transport block of the uplink service information on the target PUSCH, $C_{UL-SCH}$ is the number of transport blocks of the uplink service information on the target PUSCH, $Q'_{ACK,HP}$ is the number of coded modulation symbols per layer when a second-priority HARQ-ACK is multiplexed on the target PUSCH, $Q'_{CSI-1,HP}$ is the number of coded modulation symbols per layer when a second-priority CSI-part1 is multiplexed on the target PUSCH, and $Q'_{CSI-2,HP}$ is the number of coded modulation symbols per layer when a second-priority CSI-part2 is multiplexed on the target PUSCH; or when there is uplink service information on the target PUSCH and that a priority of the target PUSCH is the first priority, determining, according to the following formulas, for first-priority target CSI comprised in the first target UCI, the number $Q'_{CSI-1,LP}$ of coded modulation symbols per layer when a CSI-part1 in the target CSI is multiplexed on the target PUSCH, and the number $Q'_{CSI-2,LP}$ of coded modulation symbols per layer when a CSI-part2 in the target CSI is multiplexed on the target PUSCH:

$Q'_{CSI-1,LP}$ is:

$$Q'_{CSI-1,LP} = \min\left\{\left[\frac{(O_{CSI-1,LP}+L_{CSI-1,LP})\cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r}\right],\right.$$

$$\left.\max\left\{\left[\alpha_1 \cdot \sum_{l=0}^{N_{symb,all}^{PUSCH}-1} M_{sc}^{UCI}(l)\right] - \right.\right.$$

$$\left.\left. Q'_{ACK,HP} - Q'_{CSI-1,HP} - Q'_{CSI-2,HP} - Q'_{ACK/CG-UCI,LP}, 0\right\}\right\}$$ or $$Q'_{CSI-1,LP} = \min\left\{\left[\frac{(O_{CSI-1,LP}+L_{CSI-1,LP})\cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r}\right],\right.$$

$$\left.\left[\alpha_1 \cdot \left(\sum_{l=0}^{N_{symb,all}^{PUSCH}-1} M_{sc}^{UCI}(l) - \right.\right.\right.$$

$$\left.\left.\left. Q'_{ACK,HP} - Q'_{CSI-1,HP} - Q'_{CSI-2,HP} - Q'_{ACK/CG-UCI,LP}\right)\right]\right\};$$

and
$Q'_{CSI-2,LP}$ is:

$$Q'_{CSI-2,LP} = \min\left\{\left[\frac{(O_{CSI-2,LP}+L_{CSI-2,LP})\cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r}\right],\right.$$

$$\left.\max\left\{\left[\alpha_1 \cdot \sum_{l=0}^{N_{symb,all}^{PUSCH}-1} M_{sc}^{UCI}(l)\right] - \right.\right.$$

$$\left.\left. Q'_{ACK,HP} - Q'_{CSI-1,HP} - Q'_{CSI-2,HP} - Q'_{ACK/CG-UCI,LP}, 0\right\}\right\}$$ or $$Q'_{CSI-2,LP} = \min\left\{\left[\frac{(O_{CSI-2,LP}+L_{CSI-2,LP})\cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r}\right],\right.$$

$$\left.\left[\alpha_1 \cdot \left(\sum_{l=0}^{N_{symb,all}^{PUSCH}-1} M_{sc}^{UCI}(l) - Q'_{ACK,HP} - \right.\right.\right.$$

$$\left.\left.\left. Q'_{CSI-1,HP} - Q'_{CSI-2,HP} - Q'_{ACK/CG-UCI,LP} - Q'_{CSI-1,LP}\right)\right]\right\},$$

wherein when there is no configured grant uplink control information CG-UCI on the target PUSCH and that a first-priority HARQ-ACK is transmitted on the target PUSCH, $Q'_{ACK/CG-UCI,LP}=Q'_{ACK,LP}$; when a first-priority HARQ-ACK and CG-UCI are simultaneously transmitted on the target PUSCH, $Q'_{ACK/CG-UCI,LP} = Q'_{ACK+CG-UCI,LP}$; or when CG-UCI is transmitted on the target PUSCH, but no first-priority HARQ-ACK is transmitted on the target PUSCH, $Q'_{ACK/CG-UCI,LP} = Q'_{CG-UCI}$;

wherein $Q'_{ACK,LP}$ is the number of coded modulation symbols per layer when the first-priority HARQ-ACK is multiplexed on the target PUSCH, $Q'_{ACK+CG-UCI,LP}$ is the number of coded modulation symbols per layer when the first-priority HARQ-ACK and the CG-UCI are multiplexed on the target PUSCH, $Q'_{CG-UCI}$ is the number of coded modulation symbols per layer when the CG-UCI is transmitted on the target PUSCH, $\alpha_1$ is the first control factor, $M_{sc}^{UCI}(l)$ is the number of resource elements (REs) available for transmitting UCI in an OFDM symbol l transmitted on the target PUSCH, $l=0, 1, 2, \ldots, N_{symb,all}^{PUSCH}-1$, $N_{symb,all}^{PUSCH}$ is the total number of OFDM symbols of the target PUSCH inclusive of an OFDM symbol used for transmitting a DMRS, when DCI scheduling the target PUSCH instructs a terminal not to transmit an r-th transport block, $K_r=0$, or else, $K_r$ is a size of an r-th transport block of the uplink service information on the target PUSCH, $C_{UL-SCH}$ is the number of transport blocks of the uplink service information on the target PUSCH, $O_{CSI-1,LP}$ is the number of bits of the CSI-part1, $L_{CSI-1,LP}$ is the number of CRC bits corresponding to the CSI-part 1, $\beta_{offset}^{PUSCH}$ is a parameter for calculating the number of coded modulation symbols used when the first-priority CSI is transmitted on the first-priority PUSCH, $O_{CSI-2,LP}$ is the number of bits of the CSI-part2, $L_{CSI-2,LP}$ is the number of CRC bits corresponding to the CSI-part2, $Q'_{CSI-2,HP}$ is the number of coded modulation symbols per layer when a second-priority HARQ-ACK is multiplexed on the target PUSCH, $Q'_{CSI-1,HP}$ is the number of coded modulation symbols per layer when a second-priority CSI-part1 is multiplexed on the target PUSCH, and $Q'_{CSI-2,HP}$ is the number of coded modulation symbols per layer when a second-priority CSI-part2 is multiplexed on the target PUSCH.

7. The method according to claim 4, wherein the separately determining, according to a target control factor, the number of coded modulation symbols per layer when the first target UCI and the second target UCI are multiplexed on the target PUSCH comprises:

when there is uplink service information on the target PUSCH and that a priority of the target PUSCH is the second priority, determining, according to the following formula, for a second-priority target HARQ-ACK comprised in the second target UCI, the number $Q'_{ACK,HP}$ of coded modulation symbols per layer when the target HARQ-ACK is multiplexed on the target PUSCH:

$$Q'_{ACK,HP} = \min\left\{ \left\lceil \frac{(O_{ACK,HP} + L_{ACK,HP}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \right.$$

$$\left. \left\lceil \alpha_3 \cdot \sum_{l=l_0}^{N_{symb,all}^{PUSCH}-1} M_{sc}^{UCI}(l) \right\rceil \right\}$$

wherein $\alpha_3$ is the third control factor, $O_{ACK,HP}$ is the number of bits of the target HARQ-ACK, $L_{ACK,HP}$ is the number of CRC bits corresponding to the target HARQ-ACK, $\beta_{offset}^{PUSCH}$ is a parameter for calculating the number of coded modulation symbols used when the second-priority HARQ-ACK is transmitted on the second-priority PUSCH, $M_{sc}^{UCI}(l)$ is the number of resource elements (REs) available for transmitting UCI in an OFDM symbol l transmitted on the target PUSCH, $l=0, 1, 2, \ldots, N_{symb,all}^{PUSCH}-1$ $N_{symb,all}^{PUSCH}$ is total number of OFDM symbols of the target PUSCH inclusive of an OFDM symbol used for transmitting a DMRS, when DCI scheduling the target PUSCH instructs a terminal not to transmit an r-th transport block, $K_r=0$, or else, $K_r$ is a size of an r-th transport block of the uplink service information on the target PUSCH, and $C_{UL-SCH}$ is the number of transport blocks of the uplink service information on the target PUSCH; or when there is uplink service information on the target PUSCH and that a priority of the target PUSCH is the second priority, determining, according to the following formulas, for second-priority target CSI comprised in the second target UCI, the number $Q'_{CSI-1,HP}$ of coded modulation symbols per layer when a CSI-part1 in the target CSI is multiplexed on the target PUSCH, and the number $Q'_{CSI-2,HP}$ of coded modulation symbols per layer when a CSI-part2 in the target CSI is multiplexed on the target PUSCH:

$Q'_{CSI-1,HP}$ is:

$$Q'_{CSI-1,HP} = \min\left\{ \left\lceil \frac{(O_{CSI-1,HP} + L_{CSI-1,HP}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \right.$$

$$\left. \left\lceil \alpha_3 \cdot \sum_{l=0}^{N_{symb,all}^{PUSCH}-1} M_{sc}^{UCI}(l) \right\rceil - Q'_{ACK/CG-UCI,HP} \right\};$$

and $Q'_{CSI-2,HP}$ is:

$$Q'_{CSI-2,HP} = \min\left\{ \left\lceil \frac{(O_{CSI-2,HP} + L_{CSI-2,HP}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \right.$$

$$\left. \left\lceil \alpha_3 \cdot \sum_{l=0}^{N_{symb,all}^{PUSCH}-1} M_{sc}^{UCI}(l) \right\rceil - Q'_{ACK/CG-UCI,HP} - Q'_{CSI-1,HP} \right\};$$

wherein when there is no CG-UCI on the target PUSCH and that a second-priority HARQ-ACK is transmitted on the target PUSCH, $Q'_{ACK/CG-UCI,HP}=Q'_{ACK,HP}$; when a second-priority HARQ-ACK and CG-UCI are simultaneously transmitted on the target PUSCH, $Q'_{ACK/CG-UCI,HP}=Q'_{ACK+CG-UCI,HP}$; or when CG-UCI is transmitted on the target PUSCH, but no second-priority HARQ-ACK is transmitted on the target PUSCH, $Q'_{ACK/CG-UCI,HP}=Q'_{CG-UCI}$;

wherein $Q'_{ACK,HP}$ is the number of coded modulation symbols per layer when the second-priority HARQ-ACK is multiplexed on the target PUSCH, $Q'_{ACK+CG-UCI,HP}$ is the number of coded modulation symbols per layer when the second-priority HARQ-ACK and the CG-UCI are multiplexed on the target PUSCH, $Q'_{CG-UCI}$ is the number of coded modulation symbols per layer when the CG-UCI is transmitted on the target PUSCH, $\alpha_3$ is the third control factor, $M_{sc}^{UCI}(l)$ is the number of resource elements (REs) available for transmitting UCI in an OFDM symbol l transmitted on the target PUSCH, l=0, 1, 2, . . . , $N_{symb,all}^{PUSCH}$, $N_{symb,all}^{PUSCH}$ is the total number of OFDM symbols of the target PUSCH inclusive of an OFDM symbol used for transmitting a DMRS, when DCI scheduling the target PUSCH instructs a terminal not to transmit an r-th transport block, $K_r$=0, or else, $K_r$ is a size of an r-th transport block of the uplink service information on the target PUSCH, $C_{UL-SCH}$ is the number of transport blocks of the uplink service information on the target PUSCH, $O_{CSI-1,HP}$ is the number of bits of the CSI-part1, $L_{CSI-1,HP}$ is the number of CRC bits corresponding to the CSI-part1, $\beta_{offset}^{PUSCH}$ is a parameter for calculating the number of coded modulation symbols used when the second-priority HARQ-ACK is transmitted on the second-priority PUSCH, $O_{CSI-2,HP}$ is the number of bits of the CSI-part2, and $L_{CSI-2,HP}$ is the number of CRC bits corresponding to the CSI-part2; or when there is uplink service information on the target PUSCH and that a priority of the target PUSCH is the second priority, determining, according to the following formula, for a first-priority target HARQ-ACK in the first target UCI, the number $Q'_{ACK,LP}$ of coded modulation symbols per layer when the target HARQ-ACK is multiplexed on the target PUSCH:

$$Q'_{ACK,LP} = \min\left\{\left\lceil\frac{(O_{ACK,LP} + L_{ACK,LP}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r}\right\rceil,\right.$$

$$\max\left\{\left\lceil\alpha_4 \cdot \sum_{l=l_0}^{N_{symb,all}^{PUSCH}-1} M_{sc}^{UCI}(l)\right\rceil - Q'_{ACK,HP} - Q'_{CSI-1,HP} - Q'_{CSI-2,HP}, 0\right\}\right\} \text{ or}$$

$$Q'_{ACK,LP} = \min\left\{\left\lceil\frac{(O_{ACK,LP} + L_{ACK,LP}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r}\right\rceil,\right.$$

$$\left.\left[\alpha_4 \cdot \left(\sum_{l=l_0}^{N_{symb,all}^{PUSCH}-1} M_{sc}^{UCI}(l) - Q'_{ACK,HP} - Q'_{CSI-1,HP} - Q'_{CSI-2,HP}\right)\right]\right\},$$

wherein $\alpha_4$ is the fourth control factor, $O_{ACK,LP}$ is the number of bits of the target HARQ-ACK, $L_{ACK,LP}$ is the number of CRC bits corresponding to the target HARQ-ACK, $\beta_{offset}^{PUSCH}$ is a parameter for calculating the number of coded modulation symbols used when the first-priority HARQ-ACK is transmitted on the second-priority PUSCH, $M_{sc}^{UCI}(l)$ is the number of resource elements (REs) available for transmitting UCI in an OFDM symbol l transmitted on the target PUSCH, l=0, 1, 2, . . . , $N_{symb,all}^{PUSCH}-1$, $N_{symb,all}^{PUSCH}$ is the total number of OFDM symbols of the target PUSCH inclusive of an OFDM symbol used for transmitting a DMRS, when DCI scheduling the target PUSCH instructs a terminal not to transmit an r-th transport block, $K_r$=0, or else, $K_r$ is a size of an r-th transport block of the uplink service information on the target PUSCH, $C_{UL-SCH}$ is the number of transport blocks of the uplink service information on the target PUSCH, $Q'_{ACK,HP}$ is the number of coded modulation symbols per layer when a second-priority HARQ-ACK is multiplexed on the target PUSCH, $Q'_{CSI-1,HP}$ is the number of coded modulation symbols per layer when a second-priority CSI-part1 is multiplexed on the target PUSCH, and $Q'_{CSI-2,HP}$ is the number of coded modulation symbols per layer when a second-priority CSI-part2 is multiplexed on the target PUSCH; or when there is uplink service information on the target PUSCH and that a priority of the target PUSCH is the second priority, determining, according to the following formulas, for first-priority target CSI in the first target UCI, the number $Q'_{CSI-1,LP}$ of coded modulation symbols per layer when a CSI-part1 in the target CSI is multiplexed on the target PUSCH, and the number $Q'_{CSI-2,LP}$ of coded modulation symbols per layer when a CSI-part2 in the target CSI is multiplexed on the target PUSCH:

$Q'_{CSI-1,LP}$ is:

$$Q'_{CSI-1,LP} = \min\left\{\left\lceil\frac{(O_{CSI-1,LP} + L_{CSI-1,LP}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r}\right\rceil,\right.$$

$$\max\left\{\left\lceil\alpha_4 \cdot \sum_{l=0}^{N_{symb,all}^{PUSCH}-1} M_{sc}^{UCI}(l)\right\rceil - \right.$$

$$\left.\left.Q'_{ACK,HP} - Q'_{CSI-1,HP} - Q'_{CSI-2,HP} - Q'_{ACK/CG-UCI,LP}, 0\right\}\right\} \text{ or}$$

$$Q'_{CSI-1,LP} = \min\left\{\left\lceil\frac{(O_{CSI-1,LP} + L_{CSI-1,LP}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r}\right\rceil,\right.$$

$$\left[\alpha_4 \cdot \left(\sum_{l=0}^{N_{symb,all}^{PUSCH}-1} M_{sc}^{UCI}(l) - \right.\right.$$

$$\left.\left.\left.Q'_{ACK,HP} - Q'_{CSI-1,HP} - Q'_{CSI-2,HP} - Q'_{ACK/CG-UCI,LP}\right)\right]\right\};$$

and $Q'_{CSI-2,LP}$ is:

$$Q'_{CSI-2,LP} = \min\left\{\left\lceil\frac{(O_{CSI-2,LP} + L_{CSI-2,LP}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r}\right\rceil,\right.$$

$$\max\left\{\left\lceil\alpha_4 \cdot \sum_{l=0}^{N_{symb,all}^{PUSCH}-1} M_{sc}^{UCI}(l)\right\rceil - Q'_{ACK,HP} - \right.$$

$$\left.\left.Q'_{CSI-1,HP} - Q'_{CSI-2,HP} - Q'_{ACK/CG-UCI,LP} - Q'_{CSI-1,LP}, 0\right\}\right\} \text{ or}$$

$$Q'_{CSI-2,LP} = \min\left\{\left\lceil\frac{(O_{CSI-2,LP} + L_{CSI-2,LP}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r}\right\rceil,\right.$$

$$\left[\alpha_4 \cdot \left(\sum_{l=0}^{N_{symb,all}^{PUSCH}-1} M_{sc}^{UCI}(l) - Q'_{ACK,HP} - \right.\right.$$

$$\left.\left.\left.Q'_{CSI-1,HP} - Q'_{CSI-2,HP} - Q'_{ACK/CG-UCI,LP} - Q'_{CSI-1,LP}\right)\right]\right\},$$

wherein when there is no CG-UCI on the target PUSCH and that a first-priority HARQ-ACK is transmitted on the target PUSCH, $Q'_{ACK/CG-UCI,LP}=Q'_{ACK,LP}$; when a first-priority HARQ-ACK and CG-UCI are simultaneously transmitted on the target PUSCH, $Q'_{ACK/CG-UCI,LP}=Q'_{ACK+CG-UCI,LP}$; or when CG-UCI is transmitted on the target PUSCH, but no first-priority HARQ-ACK is transmitted on the target PUSCH, $Q'_{ACK/CG-UCI,LP}$ and $Q'_{CG-UCI}$;

wherein $Q'_{ACK,LP}$ is the number of coded modulation symbols per layer when the first-priority HARQ-ACK is multiplexed on the target PUSCH, $Q'_{ACK+CG-UCI,LP}$ is the number of coded modulation symbols per layer when the first-priority HARQ-ACK and the CG-UCI are multiplexed on the target PUSCH, $Q'_{CG-UCI}$ is the number of coded modulation symbols per layer when the CG-UCI is transmitted on the target PUSCH, $\alpha_4$ is the fourth control factor, $M_{sc}^{UCI}(l)$ is the number of resource elements (REs) available for transmitting UCI in an OFDM symbol l transmitted on the target PUSCH, $l=0, 1, 2, \ldots, N_{symb,all}^{PUSCH}-1$, $N_{symb,all}^{PUSCH}$ is the total number of symbols of the target PUSCH inclusive of an OFDM symbol used for transmitting a DMRS, when DCI scheduling the target PUSCH instructs a terminal not to transmit an r-th transport block, $K_r=0$, or else, $K_r$ is a size of an r-th transport block of the uplink service information on the target PUSCH, $C_{UL-SCH}$ is the number of transport blocks of the uplink service information on the target PUSCH, $O_{CSI-1,LP}$ is the number of bits of the CSI-part1, $L_{CSI-1,LP}$ is the number of CRC bits corresponding to the CSI-part1, $\beta_{offset}^{PUSCH}$ is a parameter for calculating the number of coded modulation symbols used when the first-priority CSI is transmitted on the second-priority PUSCH, $O_{CSI-2,LP}$ is the number of bits of the CSI-part2, $L_{CSI-2,LP}$ is the number of CRC bits corresponding to the CSI-part2, $Q'_{ACK,HP}$ is the number of coded modulation symbols per layer when a second-priority HARQ-ACK is multiplexed on the target PUSCH, $Q'_{CSI-1,HP}$ is the number of coded modulation symbols per layer when a second-priority CSI-part1 is multiplexed on the target PUSCH, and $Q'_{CSI-2,HP}$ is the number of coded modulation symbols per layer when a second-priority CSI-part2 is multiplexed on the target PUSCH.

8. The method according to claim 4, wherein the separately determining, according to a target control factor, the number of coded modulation symbols per layer when the first target UCI and the second target UCI are multiplexed on the target PUSCH comprises:

when there is no uplink service information on the target PUSCH and that a priority of the target PUSCH is the first priority, determining, according to the following formula, for a second-priority target HARQ-ACK in the second target UCI, the number $Q'_{ACK,HP}$ of coded modulation symbols per layer when the target HARQ-ACK is multiplexed on the target PUSCH:

$$Q'_{ACK,HP} = \min\left\{\left\lceil\frac{(O_{ACK,HP}+L_{ACK,HP})\cdot \beta_{offset}^{PUSCH}}{R\cdot Q_m}\right\rceil, \left[\alpha_2 \cdot \sum_{l=l_0}^{N_{symb,all}^{PUSCH}-1} M_{sc}^{UCI}(l)\right]\right\},$$

wherein $\alpha_2$ is the second control factor, $O_{ACK,HP}$ is the number of bits of the target HARQ-ACK, $L_{ACK,HP}$ is the number of CRC bits corresponding to the target HARQ-ACK, $\beta_{offset}^{PUSCH}$ is a parameter for calculating the number of coded modulation symbols used when the second-priority HARQ-ACK is transmitted on the first priority PUSCH, $M_{sc}^{UCI}(l)$ is the number of resource elements (REs) available for transmitting UCI in an OFDM symbol l transmitted on the target PUSCH, $l=0, 1, 2, \ldots, N_{symb,all}^{PUSCH}-1$, $N_{symb,all}^{PUSCH}$ is the total number of OFDM symbols of the target PUSCH inclusive of an OFDM symbol used for transmitting a DMRS, R is a bit rate of the target PUSCH, and $Q_m$ is a modulation and coding order of the target PUSCH.

9. The method according to claim 4, wherein the separately determining, according to a target control factor, the number of coded modulation symbols per layer when the first target UCI and the second target UCI are multiplexed on the target PUSCH comprises:

when there is no uplink service information on the target PUSCH and that a priority of the target PUSCH is the first priority, determining, according to the following formula, for a first-priority HARQ-ACK in the first target UCI, the number $Q'_{ACK,LP}$ of coded modulation symbols per layer when the target HARQ-ACK is multiplexed on the target PUSCH:

$$Q'_{ACK,LP} = \min\left\{\left\lceil\frac{(O_{ACK,LP}+L_{ACK,LP})\cdot \beta_{offset}^{PUSCH}}{R\cdot Q_m}\right\rceil,\right.$$

$$\max\left\{\left[\alpha_1 \cdot \sum_{l=l_0}^{N_{symb,all}^{PUSCH}-1} M_{sc}^{UCI}(l)\right] - Q'_{ACK,HP}, 0\right\} \text{ or}$$

$$Q'_{ACK,LP} = \min\left\{\left\lceil\frac{(O_{ACK,LP}+L_{ACK,LP})\cdot \beta_{offset}^{PUSCH}}{R\cdot Q_m}\right\rceil,\right.$$

$$\left.\left[\alpha_1 \cdot \left(\sum_{l=l_0}^{N_{symb,all}^{PUSCH}-1} M_{sc}^{UCI}(l) - Q'_{ACK,HP}\right)\right]\right\},$$

wherein $\alpha_1$ is the first control factor, $O_{ACK,LP}$ is the number of bits of the target HARQ-ACK, $L_{ACK,LP}$ is the number of CRC bits corresponding to the target HARQ-ACK, $\beta_{offset}^{PUSCH}$ is a parameter for calculating the number of coded modulation symbols used when the first-priority HARQ-ACK is transmitted on the first priority PUSCH, $M_{sc}^{UCI}(l)$ is the number of resource elements (REs) available for transmitting UCI in an OFDM symbol l transmitted on the target PUSCH, $l=0, 1, 2, \ldots, N_{symb,all}^{PUSCH}-1$, $N_{symb,all}^{PUSCH}$ is the total number of OFDM symbols of the target PUSCH inclusive of an OFDM symbol used for transmitting a DMRS, R is a bit rate of the target PUSCH, $Q_m$ is a modulation and coding order of the target PUSCH, and $Q'_{ACK,HP}$ is the number of coded modulation symbols per layer when a second-priority HARQ-ACK is multiplexed on the target PUSCH.

10. The method according to claim 9, wherein the separately determining, according to a target control factor, the number of coded modulation symbols per layer when the first target UCI and the second target UCI are multiplexed on the target PUSCH comprises:

when there is no uplink service information on the target PUSCH and that the priority of the target PUSCH is the first priority, determining, according to the following formula, for first-priority target CSI in the first target UCI, the number of coded modulation symbols per layer when the target CSI is multiplexed on the target PUSCH:

when the target CSI comprises a CSI-part1 and a CSI-part2, the number of coded modulation symbols per layer for the target CSI comprises $Q'_{CSI-1,LP}$ and $Q'_{CSI-2,LP}$, and $$Q'_{CSI-1,LP} = \min\left\{\left\lceil\frac{(O_{CSI-1,LP} + L_{CSI-1,LP}) \cdot \beta_{offset}^{PUSCH}}{R \cdot Q_m}\right\rceil,\right.$$

$$\left.\sum_{l=0}^{N_{symb,all}^{PUSCH}-1} M_{sc}^{UCI}(l) - Q'_{ACK,HP} - Q'_{ACK,LP}\right\} \text{ and}$$

$$Q'_{CSI-2,LP} = \sum_{l=0}^{N_{symb,all}^{PUSCH}-1} M_{sc}^{UCI}(l) - Q'_{ACK,HP} - Q'_{ACK,LP} - Q'_{CSI-1,LP};$$

when the target CSI comprises only a CSI-part1, the number of coded modulation symbols per layer for the target CSI comprises $Q'_{CSI-1,LP}$, and $$Q'_{CSI-1,LP} = \sum_{l=0}^{N_{symb,all}^{PUSCH}-1} M_{sc}^{UCI}(l) - Q'_{ACK,HP} - Q'_{ACK,LP},$$

wherein $O_{CSI-1,LP}$ is the number of bits of the CSI-part1, and $L_{CSI-1,LP}$ is the number of CRC bits corresponding to the CSI-part1.

11. The method according to claim 4, wherein the separately determining, according to a target control factor, the number of coded modulation symbols per layer when the first target UCI and the second target UCI are multiplexed on the target PUSCH comprises:

when there is no uplink service information on the target PUSCH and that a priority of the target PUSCH is the second priority, determining, according to the following formula, for a second-priority target HARQ-ACK in the second target UCI, the number $Q'_{ACK,HP}$ of coded modulation symbols per layer when the target HARQ-ACK is multiplexed on the target PUSCH:

$$Q'_{ACK,HP} =$$

$$\min\left\{\left\lceil\frac{(O_{ACK,HP} + L_{ACK,HP}) \cdot \beta_{offset}^{PUSCH}}{R \cdot Q_m}\right\rceil, \left\lceil\alpha_3 \cdot \sum_{l=l_0}^{N_{symb,all}^{PUSCH}-1} M_{sc}^{UCI}(l)\right\rceil\right\},$$

wherein $\alpha_3$ is the third control factor, $O_{ACK,HP}$ is the number of bits of the target HARQ-ACK, $L_{ACK,HP}$ is the number of CRC bits corresponding to the target HARQ-ACK, $\beta_{offset}^{PUSCH}$ is a parameter for calculating the number of coded modulation symbols used when the second-priority HARQ-ACK is transmitted on the second priority PUSCH, $M_{sc}^{UCI}(l)$ is the number of resource elements (REs) available for transmitting UCI in an OFDM symbol l transmitted on the target PUSCH, l=0, 1, 2, . . . , $N_{symb,all}^{PUSCH}-1$, $N_{symb,all}^{PUSCH}$ is the total number of OFDM symbols of the target PUSCH inclusive of an OFDM symbol used for transmitting a DMRS, R is a bit rate of the target PUSCH, and $Q_m$ is a modulation and coding order of the target PUSCH.

12. The method according to claim 11, wherein the determining the number of coded modulation symbols per layer when the target UCI is multiplexed on the target PUSCH comprises:

when there is no uplink service information on the target PUSCH and that the priority of the target PUSCH is the second priority, determining, according to the following formula, for second-priority target CSI in the second target UCI, the number of coded modulation symbols per layer when the target CSI is multiplexed on the target PUSCH:

when the target CSI comprises a CSI-part1 and a CSI-part2, the number of coded modulation symbols per layer for the target CSI comprises $Q'_{CSI-1,HP}$ and $Q'_{CSI-2,HP}$, and $$Q'_{CSI-1,HP} = \min\left\{\left\lceil\frac{(O_{CSI-1,HP} + L_{CSI-1,HP}) \cdot \beta_{offset}^{PUSCH}}{R \cdot Q_m}\right\rceil,\right.$$

$$\left.\sum_{l=0}^{N_{symb,all}^{PUSCH}-1} M_{sc}^{UCI}(l) - Q'_{ACK,HP}\right\} \text{ and}$$

$$Q'_{CSI-2,HP} = \min\left\{\left\lceil\frac{(O_{CSI-2,HP} + L_{CSI-2,HP}) \cdot \beta_{offset}^{PUSCH}}{R \cdot Q_m}\right\rceil,\right.$$

$$\left.\sum_{l=0}^{N_{symb,all}^{PUSCH}-1} M_{sc}^{UCI}(l) - Q'_{ACK,HP} - Q'_{CSI-1,HP}\right\};$$

or when the target CSI comprises only a CSI-part1, the number of coded modulation symbols per layer for the target CSI comprises $Q'_{CSI-1,HP}$, and $$Q'_{CSI-1,HP} = \sum_{l=0}^{N_{symb,all}^{PUSCH}-1} M_{sc}^{UCI}(l) - Q'_{ACK,HP},$$

wherein $O_{CSI-1,HP}$ is the number of bits of the CSI-part1, $L_{CSI-1,HP}$ is the number of CRC bits corresponding to the CSI-part1, $\beta_{offset}^{PUSCH}$ is a parameter for calculating the number of coded modulation symbols used when the second-priority CSI is transmitted on the second-priority PUSCH, $O_{CSI-2,HP}$ is the number of bits of the CSI-part2, and $L_{CSI-2,HP}$ is the number of CRC bits corresponding to the CSI-part2.

13. The method according to claim 12, wherein the separately determining, according to a target control factor, the number of coded modulation symbols per layer when the first target UCI and the second target UCI are multiplexed on the target PUSCH comprises:

when there is no uplink service information on the target PUSCH and that the priority of the target PUSCH is the second priority, determining, according to the following formula, for a first-priority target HARQ-ACK in the first target UCI, the number $Q'_{ACK,LP}$ of coded modulation symbols per layer when the first-priority target HARQ-ACK is multiplexed on the target PUSCH:

$$Q'_{ACK,LP} = \min\left\{\left\lceil\frac{(O_{ACK,LP} + L_{ACK,LP}) \cdot \beta_{offset}^{PUSCH}}{R \cdot Q_m}\right\rceil,\right.$$

$$\max\left\{\left\lceil\alpha_4 \cdot \sum_{l=l_0}^{N_{symb,all}^{PUSCH}-1} M_{sc}^{UCI}(l)\right\rceil - Q'_{ACK,HP} - Q'_{CSI-1,HP} - Q'_{CSI-2,HP}, 0\right\}\right\} \text{ or}$$

$$Q'_{ACK,LP} = \sum_{l=l_0}^{N_{symb,all}^{PUSCH}-1} M_{sc}^{UCI}(l) - Q'_{ACK,HP} - Q'_{CSI-1,HP} - Q'_{CSI-2,HP},$$

wherein $\alpha_4$ is the fourth control factor, $O_{ACK,LP}$ is the number of bits of the target HARQ-ACK, and $L_{ACK,LP}$ is the number of CRC bits corresponding to the target HARQ-ACK.

14. The method according to claim 1, wherein the obtaining, by a communications device, at least one control factor comprises:
    configuring, by a network-side device, the at least one control factor for a terminal; or
    obtaining, by a terminal, the at least one control factor configured by a network-side device;
    wherein the configuring, by a network-side device, the at least one control factor for a terminal comprises one of the following:
    configuring, by the network-side device, the at least one control factor multiple times, one or more of the at least one control factor per time; and
    configuring, by the network-side device, the at least one control factor once.

15. A communications device, comprising a processor, a memory, and a program or instructions stored in the memory and capable of running on the processor, wherein when the program or instructions are executed by the processor, following steps are implemented:
    obtaining, by a communications device, at least one control factor, wherein the control factor is used to limit a resource element (RE) occupied when uplink control information (UCI) is multiplexed on a physical uplink shared channel (PUSCH);
    determining first target UCI and second target UCI multiplexed on a target PUSCH for transmission, wherein a priority of the first target UCI is a first priority, a priority of the second target UCI is a second priority, and the first priority is lower than the second priority; and
    separately determining, according to a target control factor, the number of coded modulation symbols per layer when the first target UCI and the second target UCI are multiplexed on the target PUSCH, wherein the target control factor is one or more of the at least one control factor.

16. The communications device according to claim 15, wherein the at least one control factor comprises at least one of the following:
    a first control factor used to control a resource occupied when first-priority UCI is multiplexed on a first-priority PUSCH;
    a second control factor used to control a resource occupied when second-priority UCI is multiplexed on a first-priority PUSCH;
    a third control factor used to control a resource occupied when second-priority UCI is multiplexed on a second-priority PUSCH; and
    a fourth control factor used to control a resource occupied when first-priority UCI is multiplexed on a second-priority PUSCH.

17. The communications device according to claim 16, wherein the separately determining, according to a target control factor, the number of coded modulation symbols per layer when the first target UCI and the second target UCI are multiplexed on the target PUSCH comprises:
    separately determining, in the following order, the number of coded modulation symbols per layer when the first target UCI and the second target UCI are multiplexed on the target PUSCH:
    first determining the number of coded modulation symbols per layer when high-priority UCI is multiplexed on the target PUSCH, and then determining the number of coded modulation symbols per layer when low-priority UCI is multiplexed on the target PUSCH, wherein when UCI with a same priority comprises different types of UCI, the number of coded modulation symbols per layer when hybrid automatic repeat request acknowledgement (HARQ-ACK) information is multiplexed on the target PUSCH is first determined, and then the number of coded modulation symbols per layer when channel state information (CSI) is multiplexed on the target PUSCH is determined; or
    first determining the number of coded modulation symbols per layer when a HARQ-ACK is multiplexed on the target PUSCH, and then determining the number of coded modulation symbols per layer when CSI is multiplexed on the target PUSCH, wherein when a same type of UCI comprises UCI with different priorities, the number of coded modulation symbols per layer when high-priority UCI is multiplexed on the target PUSCH is first determined, and then the number of coded modulation symbols per layer when low-priority UCI is multiplexed on the target PUSCH is determined.

18. The communications device according to claim 15, wherein when the program or instructions are executed by the processor, following steps are implemented:
    separately determining, according to a target parameter, the number of coded modulation symbols per layer when the first target UCI and the second target UCI are multiplexed on the target PUSCH, wherein, for PUSCHs with different priorities and UCI with different priorities and/or of different types, the target parameter is a parameter for calculating the number of coded modulation symbols used.

19. A non-transitory readable storage medium, wherein the non-transitory readable storage medium stores a program or instructions, and when the program or instructions are executed by a processor, following steps are implemented:
    obtaining, by a communications device, at least one control factor, wherein the control factor is used to limit a resource element (RE) occupied when uplink control information (UCI) is multiplexed on a physical uplink shared channel (PUSCH);
    determining first target UCI and second target UCI multiplexed on a target PUSCH for transmission, wherein a priority of the first target UCI is a first priority, a priority of the second target UCI is a second priority, and the first priority is lower than the second priority; and
    separately determining, according to a target control factor, the number of coded modulation symbols per layer when the first target UCI and the second target UCI are multiplexed on the target PUSCH, wherein the target control factor is one or more of the at least one control factor.

20. The non-transitory readable storage medium according to claim 19, wherein the at least one control factor comprises at least one of the following:
    a first control factor used to control a resource occupied when first-priority UCI is multiplexed on a first-priority PUSCH;
    a second control factor used to control a resource occupied when second-priority UCI is multiplexed on a first-priority PUSCH;
    a third control factor used to control a resource occupied when second-priority UCI is multiplexed on a second-priority PUSCH; and
    a fourth control factor used to control a resource occupied when first-priority UCI is multiplexed on a second-priority PUSCH.

* * * * *